US012769858B2

(12) United States Patent
Wilhelm et al.

(10) Patent No.: US 12,769,858 B2
(45) Date of Patent: Oct. 20, 2026

(54) ONLINE SOFTWARE PLATFORM (OSP) EXTRACTING DATA OF CLIENT FOR IMPROVED ON-BOARDING OF THE CLIENT ONTO THE OSP

(71) Applicant: Avalara, Inc., Seattle, WA (US)

(72) Inventors: Mark Wilhelm, Brainbridge Island, WA (US); Mrunalini Kulkarni, Pune (IN); Simone van Rheenen, Issaquah, WA (US); Rahul Aggarwal, Pune (IN); Vimal Shantibhai Santoki, Pune (IN); Mark Janzen, Wichita, KS (US); Rohit Ghule, Pune (IN)

(73) Assignee: Avalara, Inc., Seattle, WA (US)

( * ) Notice: Subject to any disclaimer, the term of this patent is extended or adjusted under 35 U.S.C. 154(b) by 920 days.

(21) Appl. No.: 17/089,485

(22) Filed: Nov. 4, 2020

(65) Prior Publication Data

US 2022/0138337 A1 May 5, 2022

(51) Int. Cl.

| | |
|---|---|
| ***G06F 21/62*** | (2013.01) |
| ***G06F 9/451*** | (2018.01) |
| ***G06F 16/25*** | (2019.01) |
| ***G06Q 10/0631*** | (2023.01) |
| ***G06Q 10/10*** | (2023.01) |
| ***G06Q 30/018*** | (2023.01) |
| *G06F 3/14* | (2006.01) |
| *H04L 67/01* | (2022.01) |

(52) U.S. Cl.

CPC .......... *G06F 21/6218* (2013.01); *G06F 9/451* (2018.02); *G06F 16/258* (2019.01); *G06Q 10/0631* (2013.01); *G06Q 10/10* (2013.01); *G06Q 30/0185* (2013.01); *G06F 3/14* (2013.01); *H04L 67/01* (2022.05)

(58) Field of Classification Search

CPC ............................ G06Q 30/04; G06F 21/6218

See application file for complete search history.

(56) References Cited

U.S. PATENT DOCUMENTS

| | | | | |
|---|---|---|---|---|
| 7,783,536 | B2 | 8/2010 | William et al. | |
| 7,933,803 | B1 | 4/2011 | Nadler et al. | |
| 8,620,578 | B1 | 12/2013 | Brown et al. | |
| 8,725,407 | B2 | 5/2014 | Hurley et al. | |
| 9,760,915 | B2 | 9/2017 | Pavlou et al. | |
| 10,445,818 | B1 | 10/2019 | Chowdhary | |
| 10,769,611 | B2 | 9/2020 | McNeel | |
| 11,044,171 | B2 * | 6/2021 | Gopireddy | H04L 67/563 |
| 2003/0101112 | A1 | 5/2003 | Gallagher et al. | |
| 2006/0059088 | A1 * | 3/2006 | Krikorian | G06Q 20/14 705/40 |

(Continued)

OTHER PUBLICATIONS

Z. Zhao et al., "Autonomic Communications in Software-Driven Networks," in IEEE Journal on Selected Areas in Communications, vol. 35, No. 11, pp. 2431-2445, Nov. 2017, doi: 10.1109/JSAC.2017.2760354. (Year: 2017).*

(Continued)

*Primary Examiner* — Apu M Mofiz

(74) *Attorney, Agent, or Firm* — Jeremiah J. Baunach; Frontier IP Law PLLC

(57) ABSTRACT

A novel architecture of connections and Graphical User Interfaces (GUIs) is used to facilitate extracting a client business's data that is stored in some locations, and copying it to other locations for further processing according to digital rules.

14 Claims, 16 Drawing Sheets

FIRST MAIN EMBODIMENTS

(56) References Cited

U.S. PATENT DOCUMENTS

| | | | | |
|---|---|---|---|---|
| 2007/0136158 | A1 | 6/2007 | Rawlings et al. | |
| 2007/0136159 | A1 | 6/2007 | Rawlings et al. | |
| 2011/0119274 | A1 | 5/2011 | Clayton et al. | |
| 2015/0163206 | A1* | 6/2015 | McCarthy | H04L 63/104 726/4 |
| 2015/0339484 | A1* | 11/2015 | Shah | H04L 67/02 707/783 |
| 2015/0379469 | A1* | 12/2015 | Gordon | G06F 16/951 705/342 |
| 2017/0041296 | A1* | 2/2017 | Ford | G06F 21/64 |
| 2019/0095488 | A1* | 3/2019 | Bhattacharjee | G06F 16/951 |
| 2019/0394204 | A1* | 12/2019 | Bansal | H04L 63/0815 |
| 2020/0019558 | A1* | 1/2020 | Okorafor | G06F 21/6254 |
| 2020/0279015 | A1* | 9/2020 | Lu | G06Q 10/067 |
| 2021/0248615 | A1* | 8/2021 | Shukla | G06Q 30/01 |
| 2021/0350429 | A1* | 11/2021 | Gangadarappa | G06Q 30/04 |
| 2022/0335387 | A1* | 10/2022 | Ratan | G06Q 10/1053 |
| 2022/0398285 | A1* | 12/2022 | Rose | G06F 16/288 |

OTHER PUBLICATIONS

International Search Report and Written Opinion of International Application No. PCT/US2021/048528, mailing date of Dec. 22, 2021, 14 pages.

* cited by examiner

*FIRST MAIN EMBODIMENTS*

SECOND MAIN EMBODIMENTS

*SAMPLE CONVERSION OF DATASET*

*SAMPLE EXTRACTED DATASETS*

*SAMPLE FILTERING OF DATASETS*

APPLY RULES TO DATASETS

NOTIFICATION

ONLINE SOFTWARE PLATFORM (OSP) EXTRACTING DATA OF CLIENT FOR IMPROVED ON-BOARDING OF THE CLIENT ONTO THE OSP

BACKGROUND

Businesses generally collect information relating to their operations, such as by using enterprise resource planning (ERP) applications and accounting applications which may interact with an online software platform (OSP) that provides various services. ERP applications manage information relating to a business's activities, such as sales, resource management, production, inventory management, delivery, billing, and so on. Accounting applications manage a business's accounting information, such as purchase orders, sales invoices, payroll, accounts payable, accounts receivable, and so on.

All subject matter discussed in this Background section of this document is not necessarily prior art, and may not be presumed to be prior art simply because it is presented in this Background section. Plus, any reference to any prior art in this description is not, and should not be taken as, an acknowledgement or any form of suggestion that such prior art forms parts of the common general knowledge in any art in any country. Along these lines, any recognition of problems in the prior art discussed in this Background section or associated with such subject matter should not be treated as prior art, unless expressly stated to be prior art. Rather, the discussion of any subject matter in this Background section should be treated as part of the approach taken towards the particular problem by the inventors. This approach in and of itself may also be inventive.

BRIEF SUMMARY

The present description gives instances of computer systems, storage media that may store programs, and methods.

In embodiments, a novel architecture of connections and Graphical User Interfaces (GUIs) is used to facilitate extracting a client business's data that is stored in some locations, and copying it to other locations for further processing according to digital rules. As such, embodiments improve the client's on-boarding operation onto the software platform.

Providing, in a timely and efficient manner, accurate and reliable data extraction presents a technical problem for current ERP applications. Another such problem is providing such data extraction without compromising security. One more such problem is providing such data extraction in a way that integrates well into existing technical environments.

The present disclosure provides systems, computer-readable media, and methods that solve these technical problems by increasing the speed, efficiency and accuracy of such specialized software platforms and computer networks, thus improving the technology of ERP software applications and accounting applications. Therefore, the systems and methods described herein for data extraction improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

These and other features and advantages of the claimed invention will become more readily apparent in view of the embodiments described and illustrated in this specification, namely in this written specification and the associated drawings.

BRIEF DESCRIPTION OF THE DRAWINGS

In the drawings, which are not necessarily drawn to scale, like numerals may describe similar components in different views. Like numerals having different suffixes may represent different instances of similar components. Some embodiments are illustrated by way of example, and not limitation, in the figures of the accompanying drawings in which.

DETAILED DESCRIPTION

As has been mentioned, the present description is about computer systems, storage media that may store programs, and methods. Embodiments are now described in more detail.

Figure 1A:
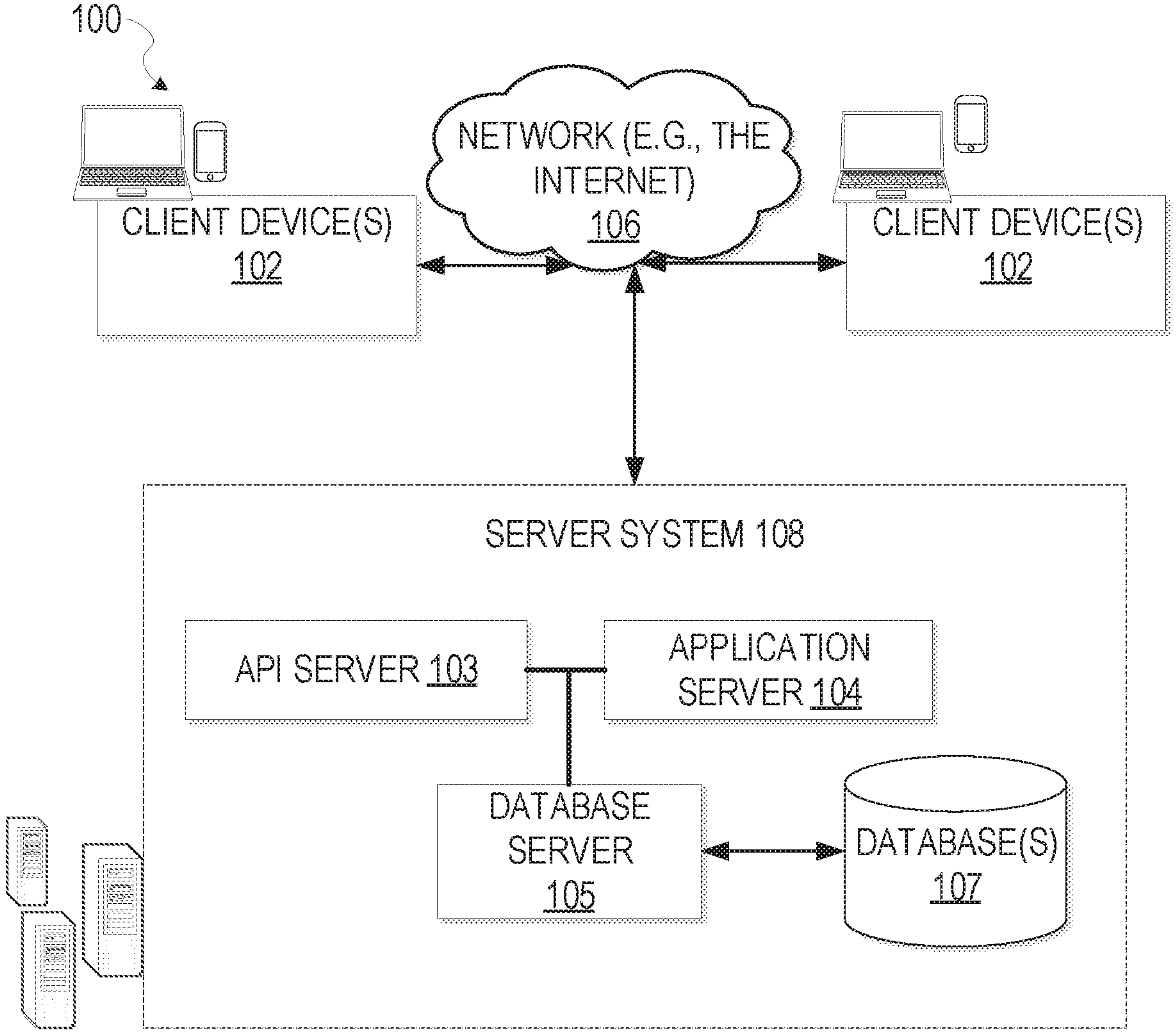
FIG. 1A is a block diagram showing an example of a system according to various embodiments of the present disclosure.

FIG. 1A is a block diagram showing an exemplary system 100 for exchanging data over a network. In this example, the system 100 includes multiple client devices 102, each of which may host a number of applications. In this context, a "client device" may refer to any machine that interfaces to a communications network to obtain resources from one or more server systems or other client devices. A client device may be, but is not limited to, a mobile phone, a desktop computer, a laptop, a portable digital assistant (PDA), a smart phone, a tablet, an ultra book, a netbook, a multi-processor system, a microprocessor-based or programmable consumer electronics device, a game console, a set-top box, or any other communication device that a user may use to access a network.

Each client device 102 may communicate and exchange data with other client devices 102, as well as with server system 108 via the network 106. The server system 108 is a computer system. Such data may include functions (e.g., commands to invoke functions) as well as payload data (e.g., text, audio, video or other multimedia data). In this context, the network 106 may be, or include, one or more portions of a network such as an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The server system 108 provides server-side functionality via the network 106 to one or more client devices (102). While certain functions of the system 100 are described herein as being performed by either a client device 102 or by the server system 108, it will be appreciated that some functionality may be interchangeably performed by either the client device 102 or by the server system 108. For example, it may be technically preferable to initially deploy certain technology and functionality within the server system 108, but later migrate this technology and functionality to a client device 102 having sufficient processing/memory capacity. Additionally, some functionality of embodiments of the present disclosure may be distributed across a plurality of different processors and/or computing devices, including one or more client devices 102 and server systems 108.

The server system 108 supports various services and operations that are provided to the client devices 102. Such operations include transmitting data to, receiving data from, and processing data generated by the client device 102. This data may include, for example, message content, client device information, geolocation information, database information, transaction data, social network information, and other information. Data exchanges within the system 100 are invoked and controlled through functions available via user interfaces (UIs) of the client devices 102.

In the example depicted in FIG. 1A, system 108 includes an Application Programming Interface (API) server 103 that is coupled to, and provides a programmatic interface to, an application server 104. The API server 103 and application server 104 are communicatively coupled to a database server 105, which facilitates access to a database 107 including data that may be processed by the application server 104. In other embodiments, the functionality of the API server 103, application server 104, and database server 105 may be performed by more or fewer systems. In some embodiments, for example, server system 108 may comprise a single server having API functionality, application functionality, and database functionality.

In the example shown in FIG. 1A, the API server 103 receives and transmits data (e.g., commands and message payloads) between the client device 102 and the server system 108. Specifically, the API server 103 provides a set of interfaces (e.g., routines and protocols) that can be called or queried by the one or more software applications running on a client device 102 in order to invoke functionality of the application server 104 or database server 105. The API server 103 exposes various functions supported by the application server 104, including account registration, login functionality, the sending of messages, search queries, and other functionality.

The application server 104 hosts a number of applications and subsystems. For example, the application server 104 may implement a variety of message processing technologies and functions, including various data-processing operations, with respect to data received within the payload of a message received from one or more client devices 102, or retrieved from one or more databases 107 by database server 105.

Online Software Platform Data Extraction for Improved Data on-Boarding

As described in more detail below, embodiments of the present disclosure help provide a software-based software platform and graphical user interface (GUI) architecture that facilitates online software platform data extraction for improved data on-boarding. For example, some embodiments may receive inputs that permit extraction of a customer's/client's data from where it presently is (e.g., another memory, such as an ERP) onto an OSP's platform, for the customer's/client's data to on-board the OSP. Data may be collected (e.g., by extraction and per user input) and rules may be applied to the collected data to make a determination (e.g., a determination that the data exceeds threshold). One or more notifications may be generated responsive to the determination, and the notification may be transmitted to the client/customer.

Figure 1B:
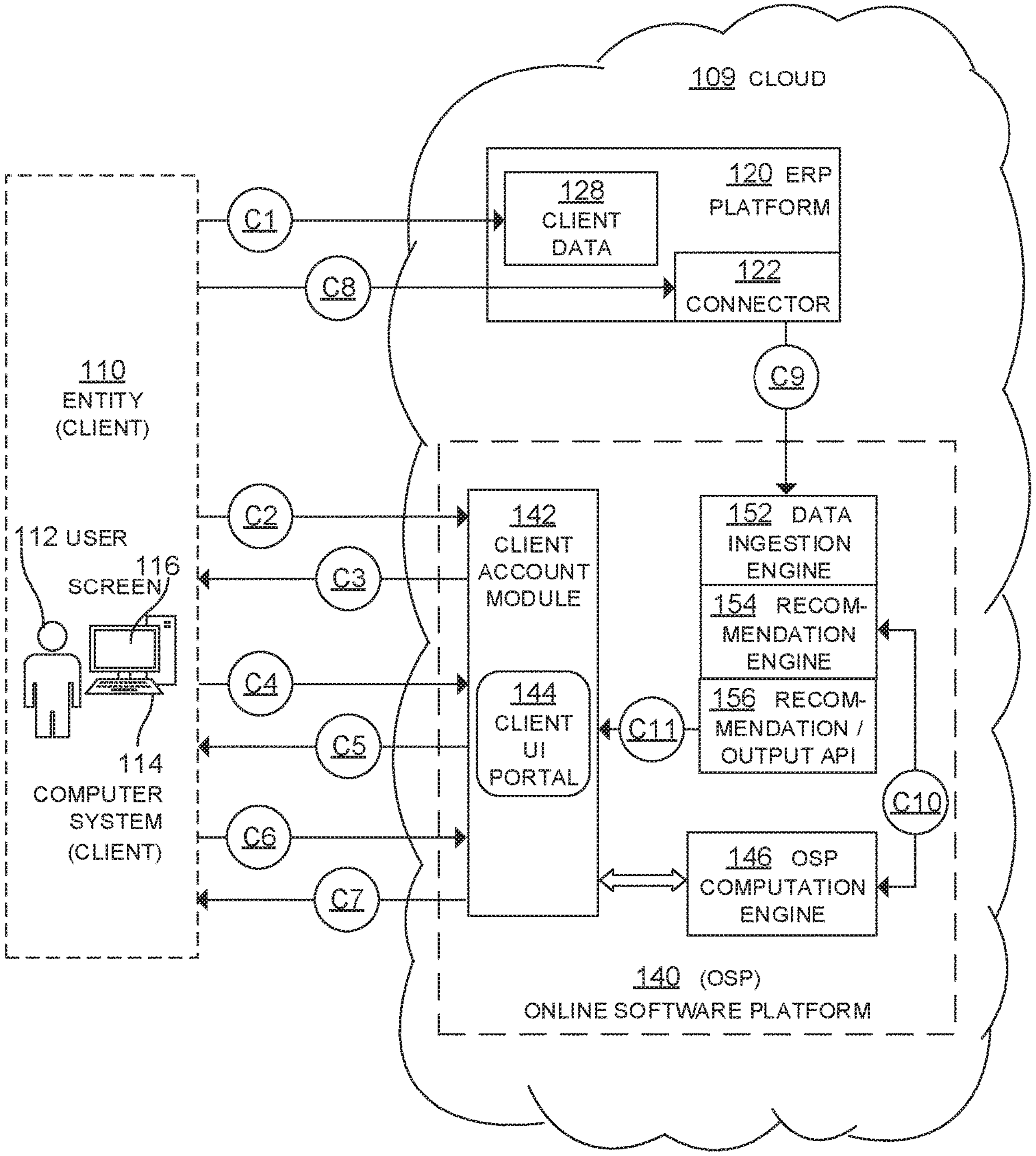
FIG. 1B illustrates an example of data extracting and onboarding according to first main embodiments of the present disclosure.

FIG. 1B illustrates an example of data extracting and onboarding according to a first set of main embodiments of the present disclosure. In this example, three entities are mainly involved, namely a client entity 110, an ERP provider that has an ERP platform 120, and a service provider that has an Online Software Platform (OSP) 140. Each of the ERP platform 120 and the OSP 140 include computer systems that are not shown separately so as to not clutter the drawing. These computer systems may be implemented in a number of ways, for example as described for server system 108. The ERP platform 120 and the OSP 140, and of course their computer systems, may be implemented online in respective communications clouds. In this example, they are provided in a single such cloud 109, such as the internet. Moreover, interactions and operations C1, C2, . . . , C11 between their computer systems are shown.

A user 112 is a client entity 110, or an agent or the client entity 110. The user 112 has a computer system 114 that has a screen 116. The client entity 110 has an account with the ERP provider, and thus may receive services from ERP platform 120. For receiving these services, according to operation C1, the client entity 110 stores its own client data 128 onto the ERP platform 120.

In this example, the client entity 110 also desires the services of OSP 140. And, in embodiments, the very client data 128 that is useful to the ERP platform 120 is also useful to the OSP 140. As such, extracting the client data 128 from the ERP platform 120 by the OSP 140 may facilitate the on-boarding of the client entity 110 to the OSP 140.

Accordingly, the client entity 110 establishes an account with the OSP 140. This account may be established in a number of ways, including via a connector or web-only access. If via a connector, such a connector may be different from the connector 128 that is described later.

In particular, according to another operation C2, the client entity 110 establishes a client account module 142 with the OSP 140. The client account module 142 includes a client UI portal 144, which may contain instructions and data for how to present information as a Graphical User Interface (GUI) onto screen 116.

Figure 2:
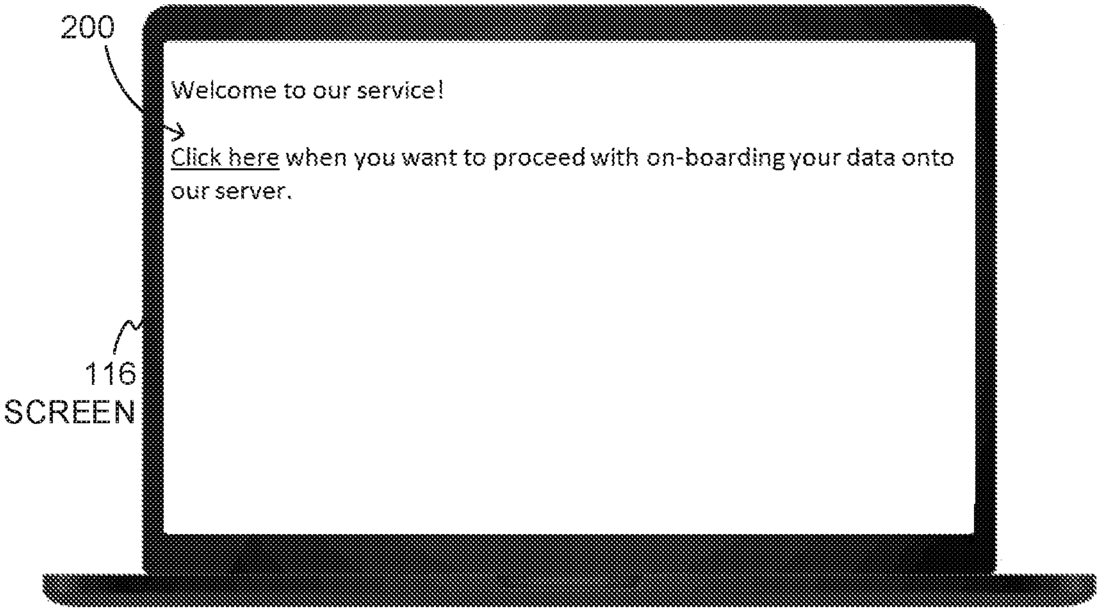
FIG. 2 depicts a sample graphical user interface (GUI) according to various embodiments of the present disclosure where on-boarding is offered.

FIG. 2 depicts a sample GUI 200, which may appear on screen 116 after operation C2. GUI 200 includes welcoming words, and a link ("click here") that invites the user 112 to proceed with on-boarding its data onto OSP 140.

Figure 3:
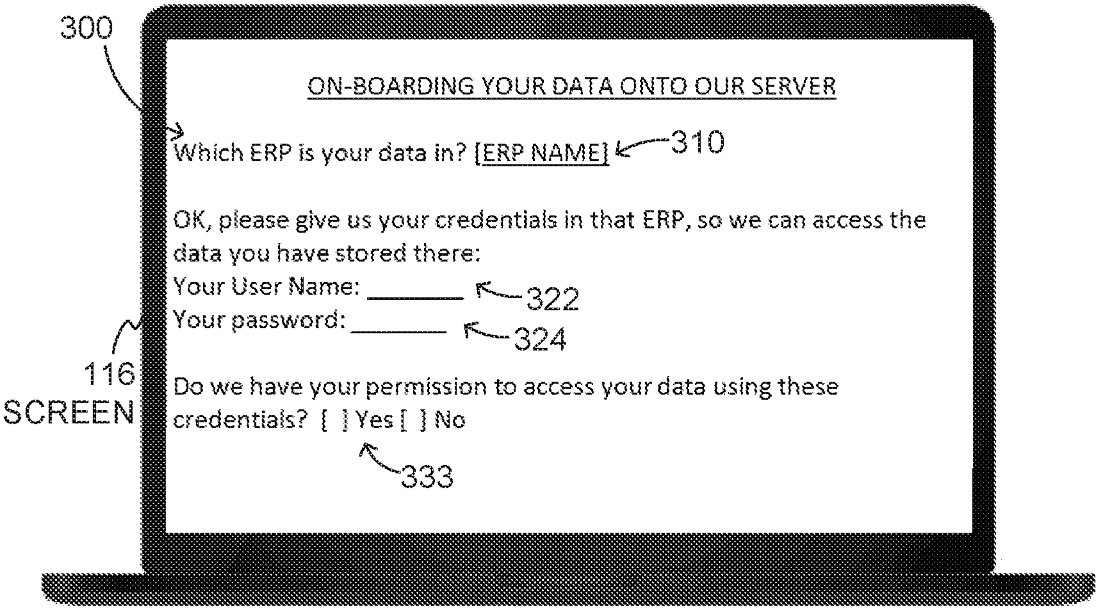
FIG. 3 depicts a sample graphical user interface (GUI) according to various embodiments of the present disclosure where credentials are requested for the on-boarding of FIG. 2.

FIG. 3 depicts a sample GUI 300, which may appear on the screen 116 at operation C2. In embodiments, GUI 300 appears upon clicking on the link of GUI 200. In other words, there has been caused to be presented, on the screen 116 of the client computer system 114, a graphical user interface (GUI) 300. The GUI 300 includes a field 310 to receive ERP identification information, fields 322, 324 to receive authentication information, and a field 333 to receive a permission indication. These may have been caused to be presented by OSP 140, within client account module 142, and within client UI portal 144. In the example of FIG. 3, all these are entered into a single screen, although that is not required. In fact, the same operations can be done individually or in smaller groups, as is now described.

Returning to FIG. 1B, according to operation C3, the OSP 140 asks, via module 142 and portal 144, where the client's data is stored, for instance which ERP. According to another operation C4, the client entity 110 may respond with the name and/or network address of the EPR platform 120, such as was seen in field 310. According to one more operation C5, the OSP 140 further asks for permission to access the client data 128, along with credentials and/or keys and/or authentication information for the accessing. These may include a user name, a password, and/or other security tokens and the like. For example, the authentication information may include credentials associated with the client entity 110. Returning to FIG. 1B, according to another operation C6, the client entity 110 may respond by giving all this information.

According to one more operation C7, the OSP 140 provides an indication for a connector that will be used for extracting. According to another operation C8, the client entity 110 may install the indicated connector 122 onto the ERP platform 120.

At one more operation C9, the connector 122 is actuated, either by the client entity 110 or by the OSP 140. This actuation results in causing the connector 122 to use the provided authentication information to access the ERP platform 120, to identify the stored client data 128, and to provide the client data 128 to the OSP 140. This providing of the data is also known as ingesting and importing the data.

The OSP 140 also includes a data ingestion engine 152, a recommendation engine 154, a recommendation output API and an OSP computation engine 146. The client data 128 may be provided to the data ingestion engine 152, which may be in the form of an application program interface (API). Of course, the client data 128 may be provided using an OSP identifier for the client entity 110.

At one more operation C10, the ingested data is normalized. The OSP computation engine 146 may process the data, filter it, compute statistics of it, apply rules to the data or statistics, and so on. In so doing, the OSP computation engine 146 may also input entity data about the client entity 110 from the client account module 142, and the applicable rules may depend on the entity data. In addition, the recommendation engine 154 may generate recommendations depending on the results of applying the rules to the imported data or its statistics.

At one more operation C11, the recommendation/output API 156 may fetch and make available, to client account module 142 and to the client UI portal 144 this data, and/or its statistics, and/or the results of applying the rules, and/or any recommendations generated from applying the rules.

In some use cases the client data 128 is transaction data from relationship instances, such as buy-sell transactions. In addition, the OSP 140 may compute tax obligations arising from the relationship instances, such as sales tax due. Applying the rules to the data may determine that economic nexus thresholds have been reached in various jurisdictions, where registration, filing returns, and remitting taxes is now required from client entity 110.

Figure 4:
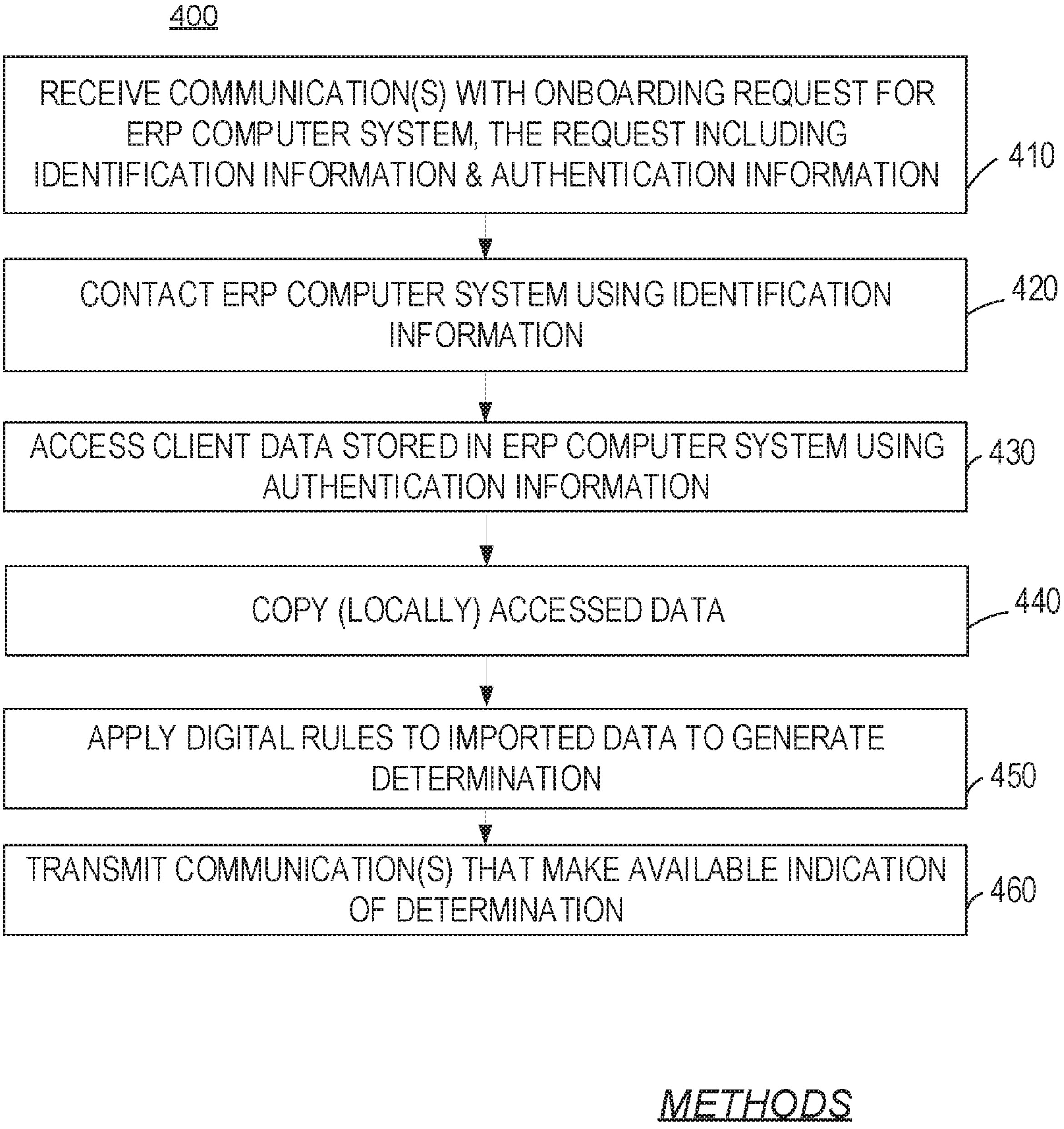
FIG. 4 is a flow diagram of an exemplary process according to the first main embodiments of FIG. 1B.

FIG. 4 shows a flowchart 400 for describing methods according to embodiments. The methods of flowchart 400 may be performed by a computer system of an online software platform (OSP) such as OSP 140 in FIG. 1B. Such an OSP computer system may be implemented by a server computer system, such as server system 108 in FIG. 1A.

According to operation 410, an OSP computer system receives via a network, from a client computer system of a client entity, such as client entity 110, one or more electronic communications. The electronic communications include an onboarding request for data of the client entity that is stored by an ERP computer system, such as that of ERP platform 120, distinct from the OSP computer system. The onboarding request includes ERP identification information about the ERP computer system and authentication information to access the data. In some embodiments, the onboarding request further includes a permission indication, and the operations may further include the OSP computer system causing to be presented, on a screen of the client computer system, a GUI that includes a field to receive the permission indication.

According to another, optional operation 420, the OSP computer system contacts, using the ERP identification information, the ERP computer system. In some embodiments, the OSP computer system may also cause to be presented, on a screen of the client computer system, a GUI that includes a field to receive the ERP identification information and/or a field to receive the authentication information.

According to another, optional operation 430, the OSP computer system accesses, using the authentication information, the data of the client entity.

Figure 18:
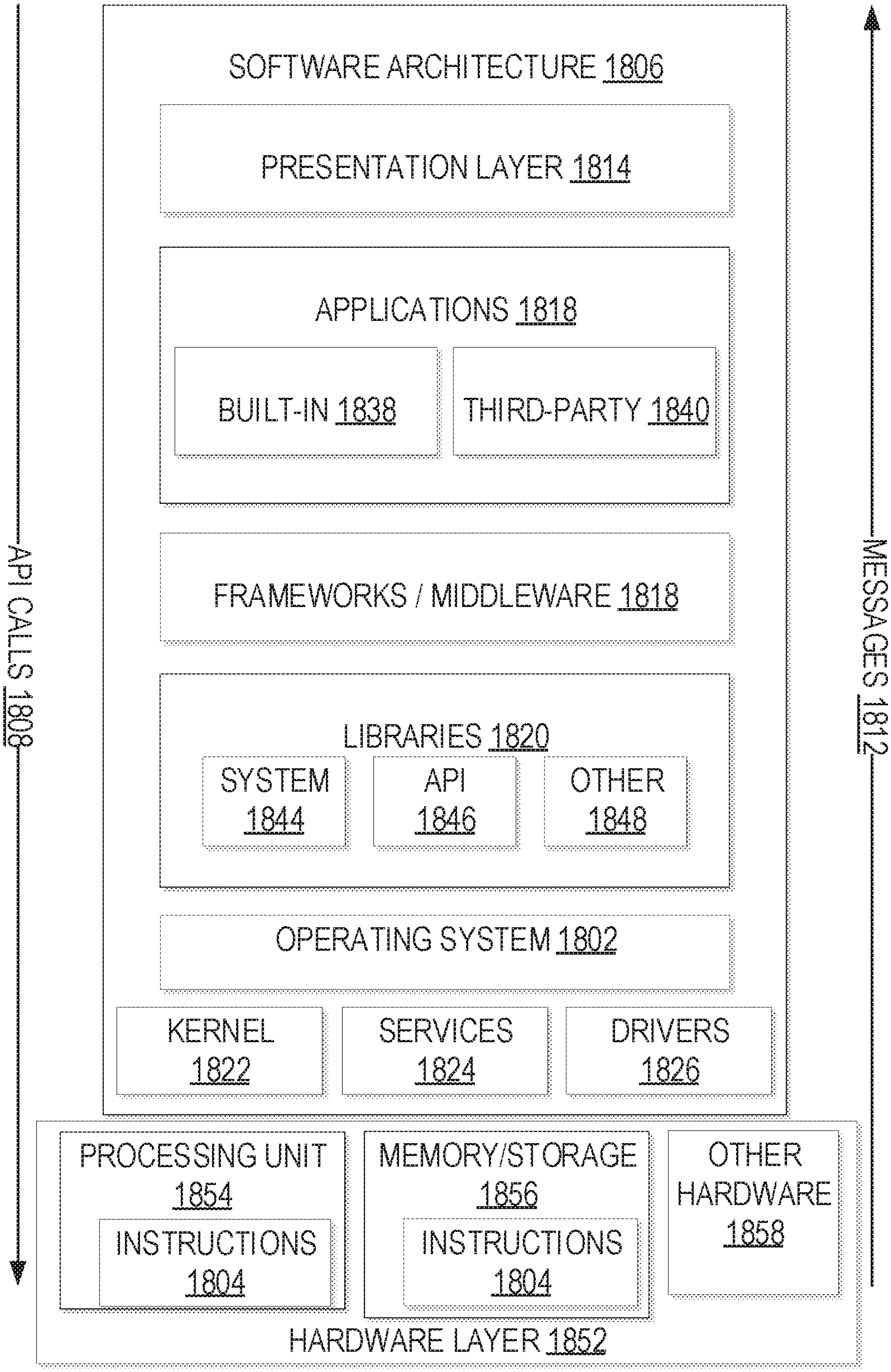
FIG. 18 is a block diagram illustrating an exemplary software architecture which may be used in conjunction with various hardware architectures herein described.
Figure 19:
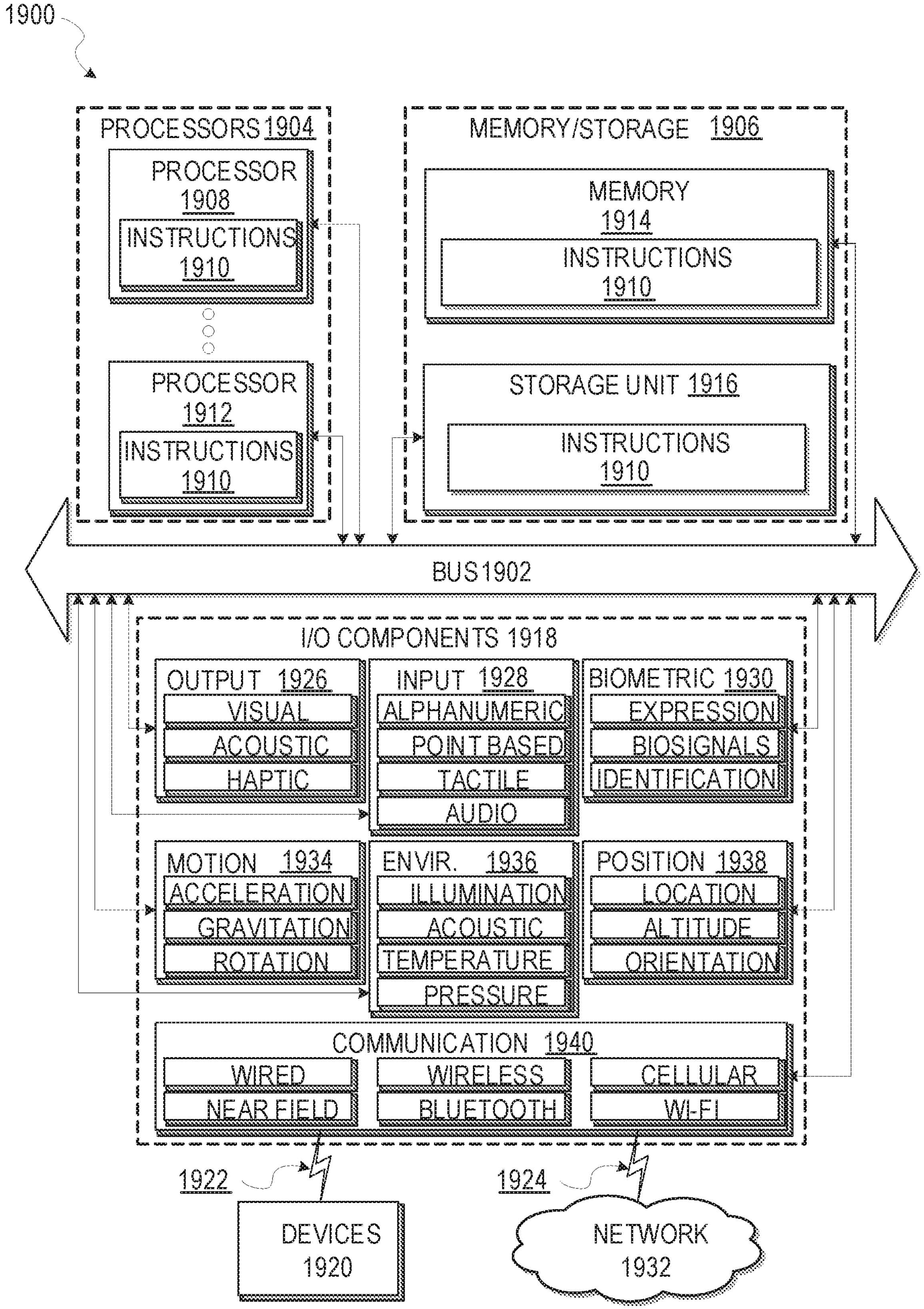
FIG. 19 is a block diagram illustrating components of an exemplary computer system according to some exemplary embodiments, which may read instructions from a machine-readable medium (e.g., a non-transitory computer-readable medium) and perform any one or more of the processes and methodologies discussed herein.

According to another, optional operation 440, the OSP computer system copies the accessed data onto one or more local non-transitory computer-readable storage media, such as that of database(s) 107 if FIG. 1A, memory storage 1856 of FIG. 18 and/or storage unit 1916 of FIG. 19.

According to another, optional operation 450, the OSP computer system applies one or more digital rules to the copied data to generate a determination. In some embodiments, the copied data is in originally a first format and the operations further include the OSP computer system converting the copied data from the first format to a second format different from the first format. The one or more digital rules are then applied to the data in the second format. For example, the copied data may include a dataset. The dataset is in the first format and includes a first dataset identifier and data in a first order. The dataset may be converted into a second format. The dataset in the second format may include a second dataset identifier and data in a second order different from the first order.

In some embodiments, the copied data include datasets that include respective attributes and the operations further include the OSP computer system filtering the datasets according to at least one of the attributes. The one or more digital rules are then applied to the filtered datasets. In some instances, the datasets are filtered according to two of the attributes, such as according to time stamps and location codes indicating locations.

According to another, optional operation 460, the OSP computer system transmits one or more electronic communications to the client computer system that make available an indication of the determination. The OSP may also cause to be presented, on a screen of the client computer system, a graphical user interface GUI that includes the indication of the determination.

In some embodiments, the copied data include datasets and the datasets include respective numerical resource values. The application of the one or more digital rules may then include adding at least two of the numerical resource values to generate a sum, and comparing the sum to a sum threshold. In this case, the indication indicates a result of the comparison to the sum threshold.

In some embodiments, the attributes include respective numerical resource values. The application the one or more digital rules may further include adding the numerical resource values of the filtered datasets to generate a sum, and comparing the sum to a sum threshold. The indication would then further indicate a result of the comparison to the sum threshold.

Figure 5:
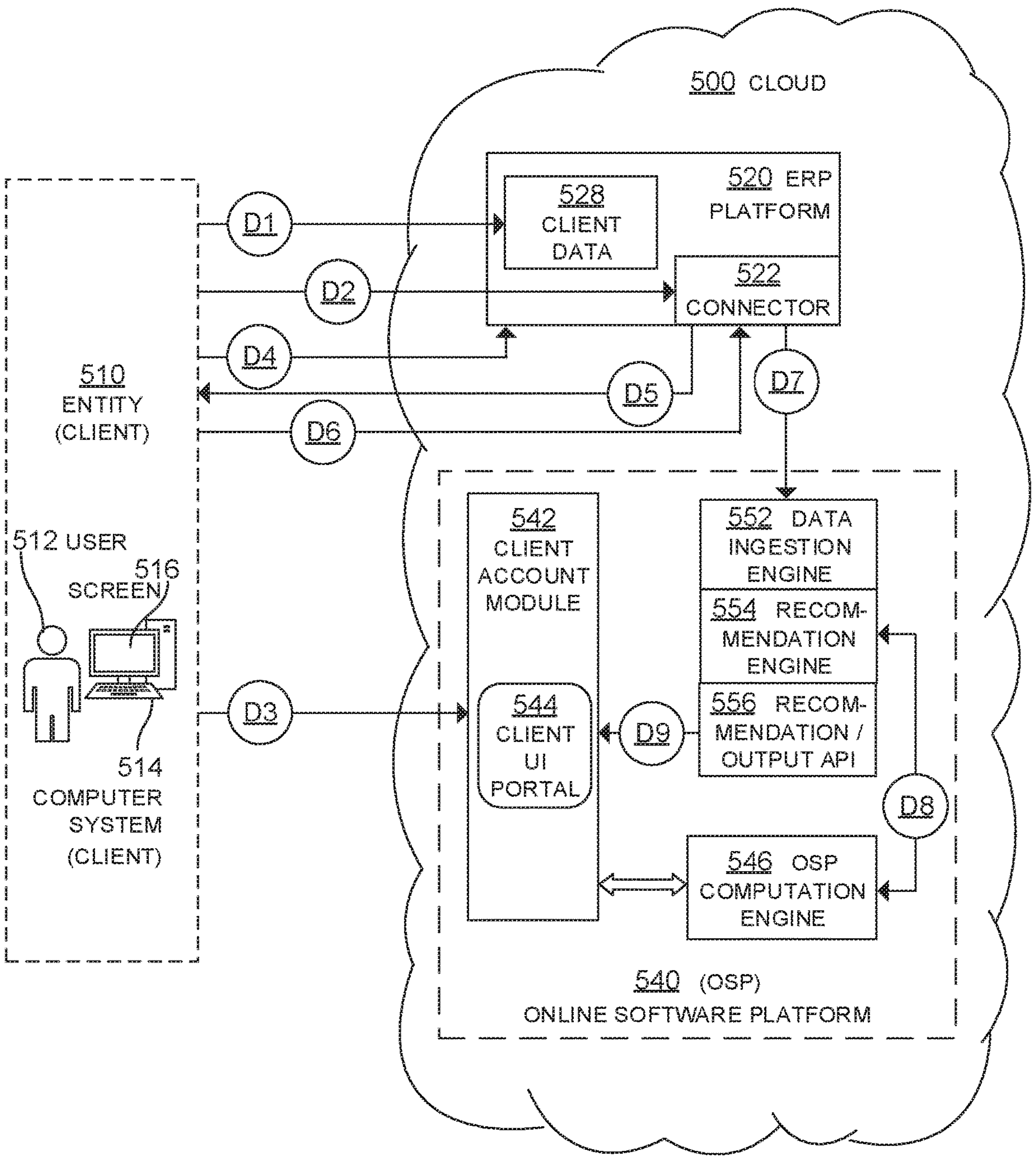
FIG. 5 illustrates an example of data extracting and onboarding according to second main embodiments of the present disclosure.

FIG. 5 illustrates an example of data extracting and onboarding according to second main embodiments of the present disclosure. In this example, three entities are mainly involved, namely a client entity 510, an ERP provider that has an ERP platform 520, and a service provider that has an Online Software Platform (OSP) 540. Each of the ERP platform 520 and the OSP 540 include computer systems that are not shown separately so as to not clutter the drawing. These computer systems may be implemented in a number of ways, for example as described for server system 108 of FIG. 1A. The ERP platform 520 and the OSP 540, and of course their computer systems, may be implemented online in respective communications clouds. In this example, they are provided in a single such cloud 500, such as the internet. Moreover, interactions and operations D1, D2, . . . , D9 between their computer systems are shown.

A user 512 is a client entity 510, or an agent or the client entity 510. The user 512 has a computer system 514 that has a screen 516. The client entity 510 has an account with the ERP provider, and thus may receive services from ERP platform 520. For receiving these services, according to operation D1, the client entity 510 stores its own client data 528 onto the ERP platform 520.

In this example, the client entity 510 also desires the services of OSP 540. And, in embodiments, the very client data 528 that is useful to the ERP platform 520 is also useful to the OSP 540. As such, extracting the client data 528 from the ERP platform 520 by the OSP 540 may facilitate the on-boarding of the client entity 510 to the OSP 540.

At operation D2, the user 512 may have discovered the OSP 540 via interaction with the ERP platform 520. For example, the ERP platform 520 may provide an online catalogue or resource directory, such as an application center, that includes or provides links to various software applications and/or services that may work with or otherwise integrate with the ERP platform 520. Such applications may be available for download via the ERP platform 520. One such application may be or include a connector 522. In particular, according to operation D2, the ERP platform 520 provides an indication for the connector 522 that will be used for extracting client data 528. According to operation D2, the client entity 510 may install the indicated connector 522 onto the ERP platform 520.

Accordingly, the client entity 510 establishes an account with the OSP 540 at operation D3. This account may be established in a number of ways, including via a connector or web-only access. If via a connector, such a connector may be different from the connector 522. In particular, according to operation D3, the client entity 510 establishes a client account module 542 with the OSP 540. The client account module 542 includes a client UI portal 544, which may contain instructions and data for how to present information as a Graphical User Interface (GUI) onto screen 516. The OSP 540 generates identification information associated with the client account for the client entity 510, such as a user name, password, credentials, keys, tokens and/or other authentication information for accessing the client account. Such authentication information may be provided to the client entity 510 via the client UI portal 544.

Figure 6:
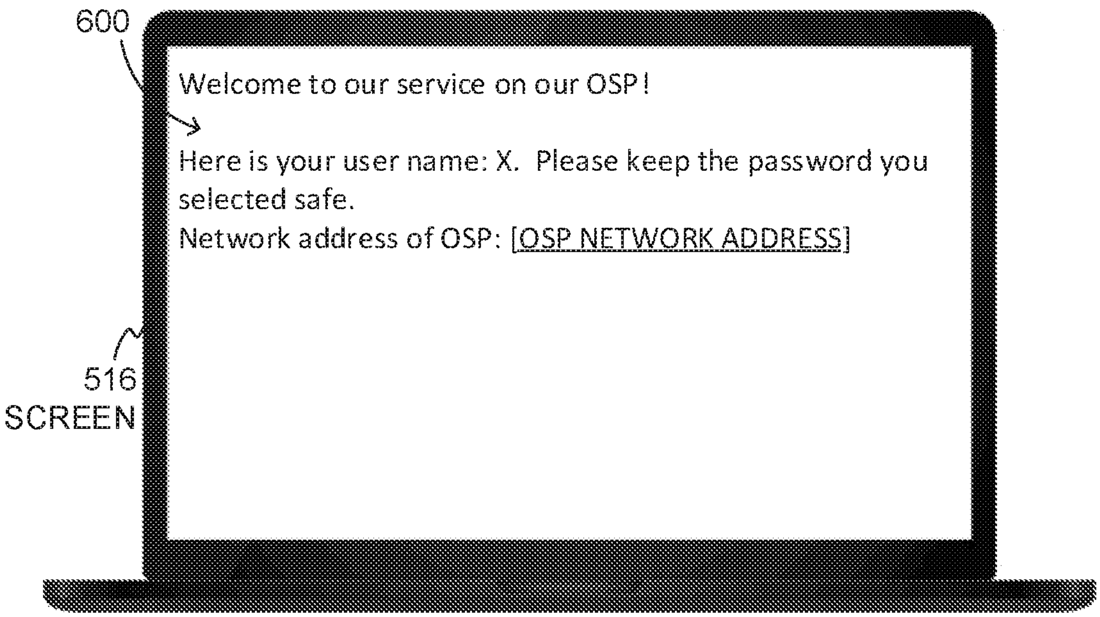
FIG. 6 depicts a sample graphical user interface (GUI) according to various embodiments of the present disclosure where extracting is implemented.

FIG. 6 depicts a sample GUI 600, which may appear on screen 516 after operation D3. GUI 600 includes welcoming words, and direction information regarding the client account established with the OSP 540, such as the login credentials and a network address (e.g., an IP address of or link to the OSP 540) which the client entity 510 can provide to the ERP platform 520 in order to proceed with on-boarding its client data 528 stored on the ERP platform 520 onto OSP 540.

Figure 7:
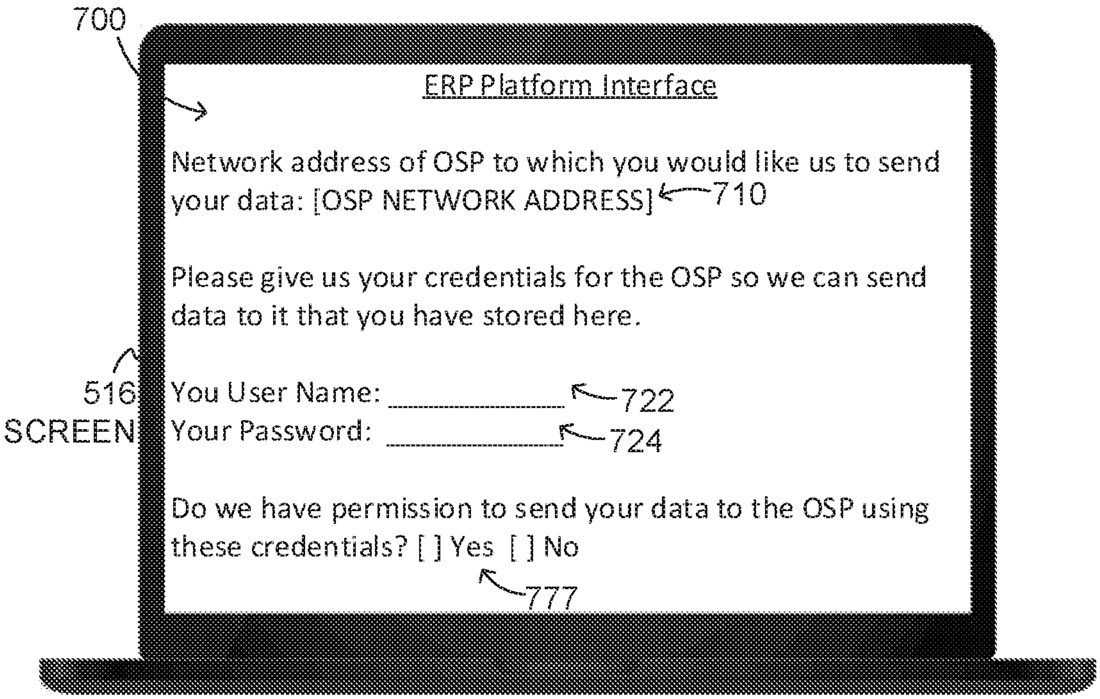
FIG. 7 depicts a sample graphical user interface (GUI) according to various embodiments of the present disclosure where permission is further requested for the extraction of FIG. 6.

FIG. 7 depicts a sample graphical user interface (GUI) 700, which may appear on the screen 516 at operation D4. In embodiments, GUI 700 appears when the user accesses the ERP platform 520 to proceed with on-boarding its data onto OSP 540 via connector 522. In other words, there has been caused to be presented, on the screen 516 of the client computer system 514, a GUI 700. The GUI 700 includes fields to receive direction information of the OSP 540, which in the present case includes a network address of the OSP 540 and login credentials. In particular, the GUI 700 includes field 710 to receive the network address of the OSP 540 and also includes, fields 722, 724 to receive authentication information, such as the login credentials of the client entity 510 for the OSP 540. The GUI 700 also includes field 777 to receive a permission indication. These may have been caused to be presented by ERP platform 520. In the example of FIG. 7, all these are entered into a single screen, although that is not required. In fact, the same operations can be done individually or in smaller groups, as is now described.

Returning to FIG. 5, the ERP platform 520 receives direction information of the OSP 540, such as, for example, the network address and login credentials for the OSP 540. According to operation D4, the client entity 510 may provide the name and/or network address of the OSP 540, such as was seen in field 710 and also may provide login credentials, keys and/or other authentication information in fields 722, 724 for accessing the OSP 540 in order to send the client data 528 to the OSP 540. These may include a user name, a password, and/or other security tokens and the like. For example, the authentication information may include credentials associated with the client entity 510. According to one more operation D5, the connector 522 may ask for permission to send the client data 528 to the OSP 540. For example, the permission indication may be provided via field 777 as seen in FIG. 7. Returning to FIG. 5, according to another operation D6, the client entity 510 may respond by giving the permission.

At one more operation D7, the connector 522 is actuated, either by the client entity 510 or by the ERP platform 522. This actuation results in causing the connector 522 to identify the stored client data 528, to use the provided network address and authentication information to access the OSP 540, and to input or otherwise provide the client data 528 to the OSP 540. This providing of the data is also known as exporting the client data 528 to the OSP 540, which the OSP 540 then ingests.

The OSP 540 also includes a data ingestion engine 552, a recommendation engine 554, a recommendation output API and an OSP computation engine 546. The client data 528 may be provided to the data ingestion engine 552, which may be in the form of an application program interface (API). Of course, the client data 528 may be provided using an OSP identifier for the client entity 510.

At one more operation D8, the OSP 540 receives the client data 528, and the ingested data is normalized. The OSP computation engine 546 may process the data, filter it, compute statistics of it, apply rules to the data or statistics, and so on. In so doing, the OSP computation engine 546 may also input entity data about the client entity 510 from the client account module 542, and the applicable rules may depend on the entity data. In addition, the recommendation engine 554 may generate recommendations depending on the results of applying the rules to the imported data or its statistics.

At one more operation D9, the recommendation/output API 556 may fetch and make available, to client account module 542 and to the client UI portal 544, this data, and/or its statistics, and/or the results of applying the rules, and/or any recommendations generated from applying the rules.

In some use cases the client data 528 is transaction data from relationship instances, such as buy-sell transactions. In addition, the OSP 540 may compute tax obligations arising from the relationship instances, such as sales tax due. Applying the rules to the data may determine that economic nexus thresholds have been reached in various jurisdictions, where registration, filing returns, and remitting taxes is now required from client entity 510.

Figure 8:
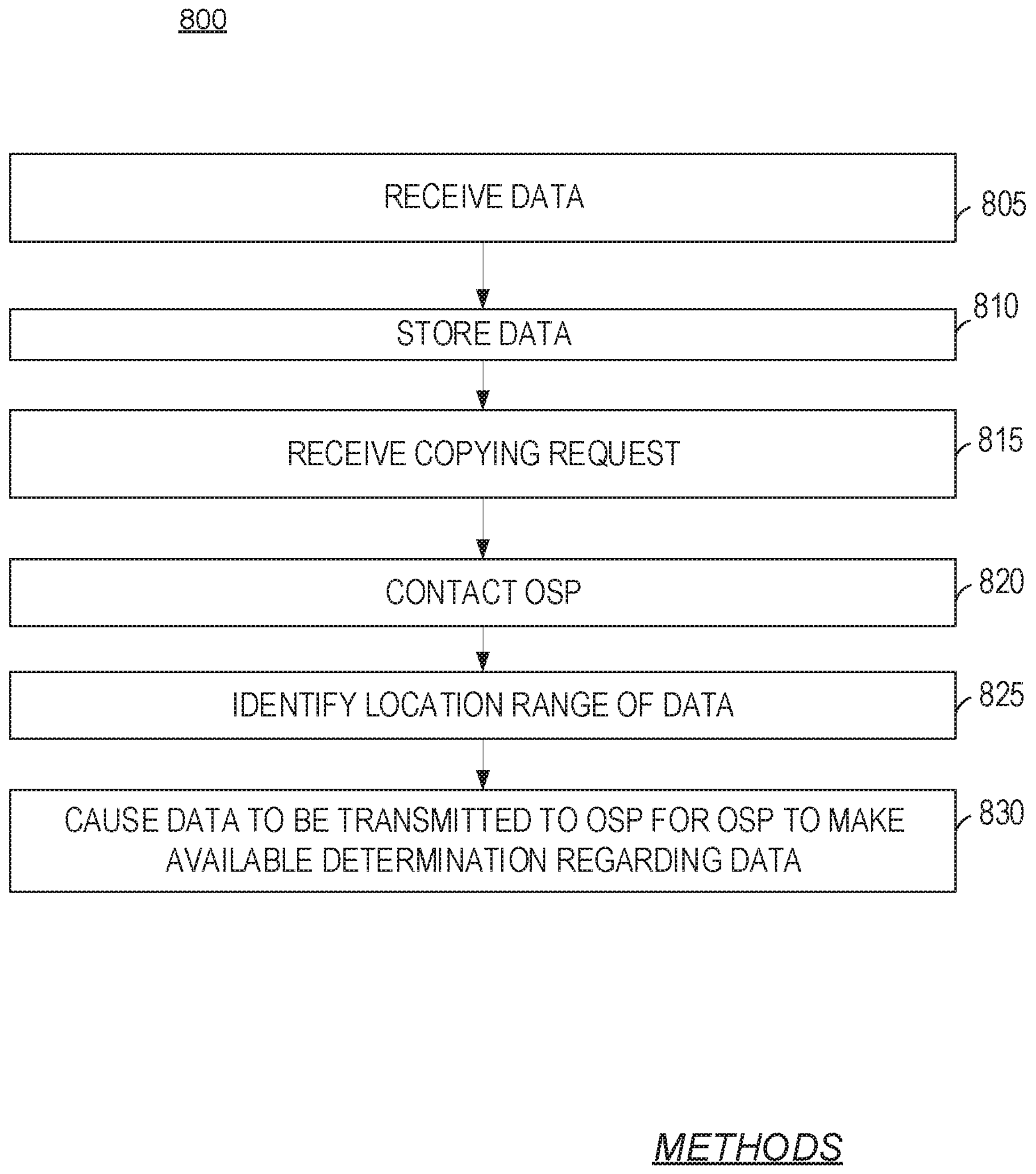
FIG. 8 is a flow diagram of an exemplary process according to the second main embodiments of FIG. 5.

FIG. 8 shows a flowchart 800 for describing methods according to embodiments. The methods of flowchart 800 may be performed by a computer system of an ERP platform, such as ERP Platform 520 in FIG. 5. Such an OSP computer system may be implemented by a client or server computer system, such as client device(s) 102 or server system 108 in FIG. 1A.

According to operation 805, an ERP computer system, such as a computer system of ERP platform 510, receives via a network, such as network 106 of FIG. 1A, from a client computer system of a client entity, such as client entity 510, data of the client entity, such as client data 528 of client entity 510.

According to another, optional operation 810, the ERP computer system stores the data onto the one or more non-transitory computer-readable storage media, such as that of database(s) 107 if FIG. 1A, memory storage 1856 of FIG. 18 and/or storage unit 1916 of FIG. 19.

According to another, optional operation 815, the ERP computer system receives, via a network, from a client computer system of the client entity, one or more electronic communications that include a copying request for the data to be copied to an OSP computer system, such as that of OSP 540, with which the client entity has an account. The OSP computer system may be distinct from the ERP computer system and the copying request includes OSP direction information about the account. For example, the OSP direction information may include one or more of: a network address of the OSP, credentials for the OSP, a token, a key, an account number, and other authentication information associated with the account.

In some embodiments, the ERP computer system causes to be presented, on a screen of the client computer system, such as screen 516, a graphical user interface (GUI) that includes a field to receive the OSP direction information, such as fields 710, 722, 724 of the GUI 700 of FIG. 7. The ERP computer system then receives, via a network, from a client computer system of the client entity, the OSP direction information via the GUI as part of the copying request.

In some embodiments, after or in response to, or on conjunction with receiving or responding to, the copying request, the ERP computer system transmits, to the client computer system of the client entity, a request for permission to transmit data stored in the location range to and for receipt by the OSP computer system. The ERP computer system then receives, via a network, from a client computer system of the client entity, permission to transmit data stored in the location range to and for receipt by the OSP computer system. For example, the request may be presented in a GUI such as GUI 700 of FIG. 7 and the permission indication is received in field 777 of the GUI 700.

According to another, optional operation 820, the ERP computer system contacts the OSP computer system using the OSP direction information.

According to another, optional operation 825, the ERP computer system identifies a location range where at least a portion of the data is stored on the one or more non-transitory computer-readable storage media.

According to another, optional operation 830, the ERP computer system causes at least a portion of the data stored in the location range to be transmitted to and for receipt by the OSP computer system using the OSP direction information. The OSP computer system may then store the data it receives, apply one or more digital rules to the stored data to generate a determination, and transmits one or more electronic communications to the client computer system that make available an indication of the determination.

In some embodiments, the ERP computer system stores, onto the one or more non-transitory computer-readable storage media, a connector, such as connector 522 of FIG. 5. In such embodiments, the contacting the OSP computer system, the identifying a location range, and the causing at least a portion of the data stored in the location range to be transmitted to and for receipt by the OSP computer system may be performed by the connector. For example, the connector may include an extractor, and the identification of a location range and the transmission of a portion of the data stored in the location range to, and for receipt by, the OSP computer system may be performed by the extractor.

In some embodiments, the connector may be received as a download at the ERP computer system. The ERP computer system may then receive, via a network, from a client computer system of the client entity, a request to install the connector. The ERP computer system then installs the connector onto the ERP computer system in response to the request to install the connector. In some embodiments, the account with the OSP computer system is created after the installation of the connector. For example, the ERP computer system may contact, via the connector, the OSP computer system to initiate creation of the account before receiving the electronic communications that include the copying request.

Figure 9:
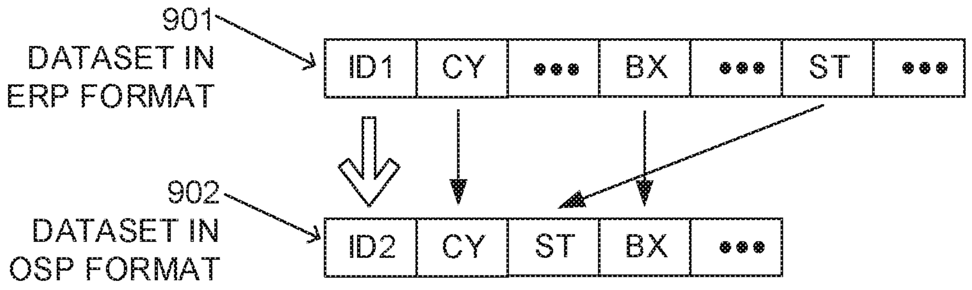
FIG. 9 illustrates an example of a conversion of a dataset format from a format used by an ERP to a format for an OSP according to various embodiments of the disclosure.

FIG. 9 illustrates an example of a conversion of a dataset format from a format used by an ERP to a format for an OSP according to various embodiments of the disclosure. For example, dataset 901 may be an example dataset included in client data, such as client data 128 of FIG. 1B and/or client data 528 of FIG. 5. The client data may include historical relationship instance data regarding a plurality of historical relationship instances between the client entity, such as client entity 110 of FIG. 1A or client entity 510 of FIG. 5, and a plurality of secondary entities (not shown). The client data includes a plurality of datasets, in which each dataset represents a respective historical relationship instance between the client entity and one of these secondary entities. Dataset 901 is an example of such a dataset.

Each dataset of the client data may have a first parameter value that serves as an identification number and one or more ancillary parameter values that are, or represent, one or more attributes of the dataset. In the present example, dataset 901 has a first parameter value that serves as an identification number, which is represented by ID1. Dataset 901 has other parameters that include ancillary parameter values. In the present embodiment, such ancillary parameter values include, for example, a calendar year associated with the relationship instance, represented by CY; a domain associated with the relationship instance, represented by ST; and a resource amount associated with the relationship instance, represented by BX. Other ancillary values may also be included in dataset 901 that are, or represent, one or more attributes of dataset 901.

In an example use case, the client entity 110 of FIG. 1B is a provider of goods or services and the client data 128 includes transaction data of transactions between the client entity 110 and one or more secondary entities (not shown). In such embodiments, each dataset in the client data 128 represents and includes data corresponding to a transaction of the client entity 110 and a secondary entity (e.g., a recipient of the goods or services). For example, in dataset 901, CY may be the calendar year in which the transaction occurred, BX may be the amount or monetary value of the transaction, and ST may be the tax jurisdiction (e.g., state or municipality) in which the transaction occurred; in which the goods or services originated, were shipped to and/or provided; in which the client entity or secondary entity is located, incorporated, has an office or has a business address; or that is otherwise associated with the transaction.

In some embodiments, the copied client data is in originally a first format and the OSP computer system, such as that the OSP 140 of FIG. 1B and/or OSP 540 of FIG. 5, may convert the copied data from the first format to a second format different from the first format, such that it may be useful to the OSP. For example, as shown in FIG. 9, dataset 901 ancillary parameter values, CY, BX and ST are in a particular first order when stored in, transmitted by, or copied from the ERP computer system, such as when stored in, transmitted by, or copied from ERP platform 120 or ERP platform 520. Some or all of the datasets of the client data may be in this particular format. During or after storing the client data, the OSP computer system may reformat or otherwise convert the order of the ancillary parameter values, CY, BX and ST of dataset 901 to generate reformatted dataset 902 in a specific OSP format. For example, in dataset 902, the order of the BX and ST parameter values have been rearranged from the order in which they appeared in dataset 901. Other ancillary parameters values may also be rearranged from the order in which they appeared in dataset 901 to be in the specific OSP format. The OSP computer system may reformat or otherwise convert some or all such datasets of the client data copied from the ERP computer system to be in the OSP format of dataset 902.

Figure 10:
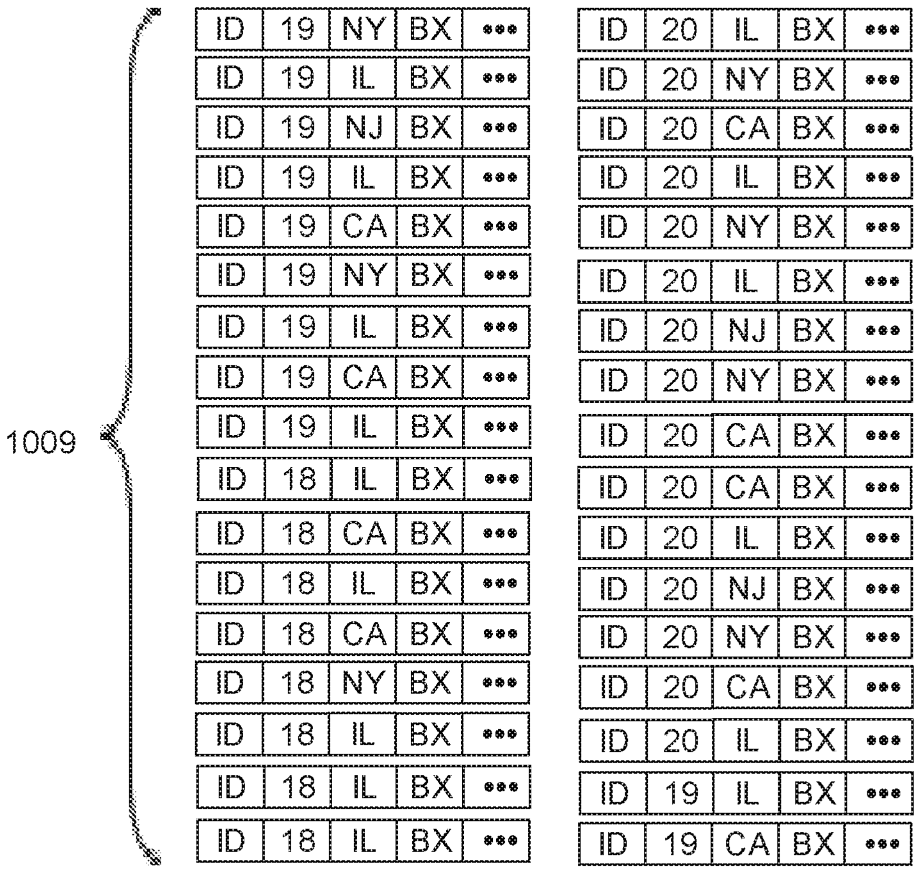
FIG. 10 illustrates an example of a plurality of extracted datasets according to various embodiments of the disclosure.

FIG. 10 illustrates an example of a plurality of extracted datasets 1009 according to various embodiments of the disclosure. The extracted datasets 1009 are an example output of data that results from an OSP computer system reformatting or otherwise converting some or all datasets of the client data copied from the ERP computer system to be in the OSP format of dataset 902. In the embodiment shown in FIG. 10, each dataset represents and includes data corresponding to a transaction of the client entity, which is a provider of goods or services, and a secondary entity (e.g., a recipient of the goods or services). Shown in extracted datasets 1009 are individual values for parameter value CY, which is, in the present example use case, the calendar year in which the transaction occurred; parameter value BX, which is, in the present example use case, the amount of the transaction; and parameter value ST, which is, in the present example use case, the domain (e.g., state) associated with the transaction. In the present example, the extracted datasets 1009 are sorted (starting on the left, from bottom to top) by the parameter value CY, or calendar year of the transaction. In the present embodiment, this sorting may have been performed by the OSP computer system.

Figure 11:
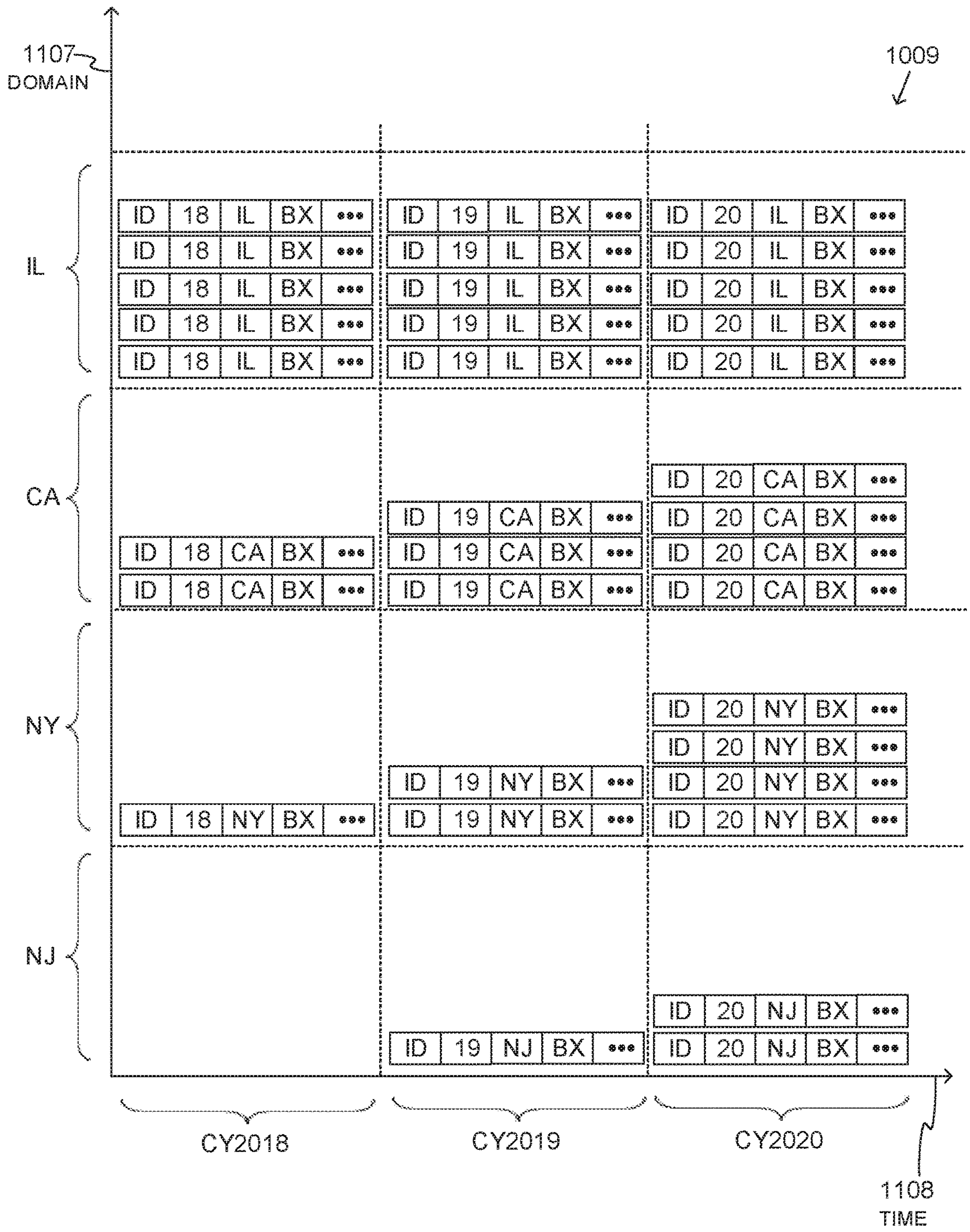
FIG. 11 illustrates the example datasets from FIG. 10 that have been filtered according to various embodiments of the disclosure.

FIG. 11 illustrates the example datasets 1009 from FIG. 10 that have been filtered according to various embodiments of the disclosure. In some embodiments, the sorting, grouping or otherwise filtering of the datasets of the converted client data in a particular manner enable or otherwise facilitate the client data to be processed by the OSP computer system in order to apply one or more digital rules to the copied data to generate a determination regarding the data. In the present example, after the conversion described with respect to FIG. 10, the copied client data is filtered (e.g., by the computer system of the OSP 140 of FIG. 1B and/or OSP 540 of FIG. 5) such that the datasets are grouped or categorized by the parameter value CY (calendar year of the transaction) and the parameter value ST (domain associated with the transaction).

The datasets 1009 are shown filtered in such a manner within a matrix in which the horizontal axis 1108 of the matrix represents time in terms of the calendar year of the transaction represented by the dataset and the vertical axis 1107 of the matrix represents the domain associated with the transaction represented by the dataset. In some embodiments, there may be multiple domains associated with a particular dataset and thus there may be multiple matrices used. Thus, each cell of the matrix contains the datasets for transactions that occurred in a particular year and that are associated with a particular domain. For example, in FIG. 11 there is one cell that contains all the datasets representing all those transactions of the client entity that occurred in 2020 in the state of New Jersey (NJ). As shown in FIG. 11, there are two datasets (representing two respective transactions) in that cell which meet that criteria. As another example, there is one cell that contains all the datasets representing all those transactions of the client entity that occurred in 2019 in the state of California (CA). As shown in FIG. 11, there are three datasets (representing three respective transactions) in that cell.

In some embodiments, the matrix shown in FIG. 11 represents a data structure of the client data as generated, filtered and/or stored by the OSP computer system, or may represent logical relationships between the datasets as a result of the filtering. In some embodiments, such filtering may be performed by a data ingestion engine of the OSP computer system, such as by data ingestion engine 152 of FIG. 1B or data ingestion engine 552 of FIG. 5. In some embodiments, the OSP computer system may extrapolate from, or interpret the filtered datasets to detect, relevant trends, patterns or other information relevant to the client entity. For example, by filtering the datasets of the copied data, the OSP computer system may detect a trend that the client entity's sales have flattened in Illinois (IL), but the client entity is more recently getting into new markets California (CA), New York (NY) and New Jersey (NJ).

Figure 12:
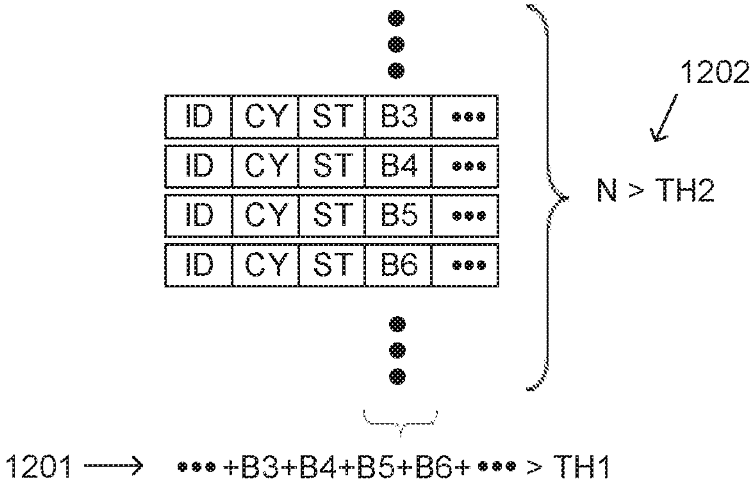
FIG. 12 illustrates an example of application of rules to datasets according to various embodiments of the disclosure.

FIG. 12 illustrates an example of application of rules to datasets according to various embodiments of the disclosure. The filtering of the datasets of the converted client data into cells, as described with respect to FIG. 11, in which each cell contains the datasets for transactions that occurred in a particular year and that are associated with a particular domain, facilitate the client data to be processed by the OSP computer system in order to apply one or more digital rules based on whether a nexus threshold has been met for particular domain in a particular calendar year. For example, such may be useful for a client entity or OSP to determine whether the client entity is subject to sales tax regulations for a particular domain and is obligated to collect and remit sales tax for particular domain, to make recommendations regarding such determinations, and to calculate what those tax amounts are or should be.

In the present example, the stored digital rules facilitate determining whether an economic nexus is established for purposes of remitting transaction tax in the certain domain (e.g. tax jurisdiction). However, different states have different thresholds for determining whether there is an economic nexus, which provides a problem for retailers in determining whether they are compliant with the tax rules in various jurisdictions, especially when the retailers have ever changing total revenue and numbers of transactions in various different domains (e.g., tax jurisdictions). Determining tax compliance under such circumstances for multiple retailers in various different jurisdictions according to the various different rules for the different tax jurisdictions and communicating such information to the retailers or other entities efficiently as rules are changing presents a technical problem in order to do so in a timely and efficient manner over computer networks and in a way that integrates well into existing technical environments in which tax assistance is provided. The present disclosure provides systems and methods that solve this technical problem by improving the speed, efficiency and accuracy of such specialized software platforms and computer networks and onboarding users for such systems.

For example, the digital rules applied by the OSP may be based on regulations regarding a monetary amount of sales that are associated with each of various tax jurisdictions (e.g., states) and/or a volume of sales transactions that are associated with each of various tax jurisdictions. In an embodiment, the regulation may indicate the client entity is obligated to collect and remit sales tax in a particular tax jurisdiction if a particular economic nexus is met. For example, this particular economic nexus may be that within a particular calendar year, the total number of transactions exceed a particular threshold and the sum of the transaction amounts of all those transactions in that calendar year exceed another threshold. Thus, the digital rule based on the regulation will test the datasets representing those transactions to determine whether the thresholds are met for those datasets.

In the present embodiment, the computer system of the OSP (e.g., the computation engine 146 of the OSP 140 of FIG. 1B and/or the computation engine 546 the OSP 540 of FIG. 5) applies such a digital rule to each cell of the matrix of FIG. 11, as each cell contains datasets for a particular year and particular tax jurisdiction. In various embodiments, different digitals rule may be applied to different cells associated with different domains, as each domain (e.g., tax jurisdiction) may have different tax regulations on which the digital rules are based. For example, as shown in FIG. 12, for each cell in the matrix of FIG. 11, the computer system of the OSP calculates the sum of the transaction amounts (represented by parameter value BX in each dataset) of all the datasets in the cell, which represents the monetary amount of sales for the client entity in the particular year and domain associated with that cell. The computer system of the OSP then determines whether this sum exceeds a threshold (TH1), represented by inequality 1201. For each cell in the matrix of FIG. 11, the computer system of the OSP may also calculate the total number of datasets (N) in the cell, which represents the total number of transactions of the client entity in the domain and calendar year associated with that cell. The computer system of the OSP then determines whether the total number of datasets in the cell exceeds a threshold (TH2), represented by inequality 1202. According to the digital rule in the present example, if the sum of the transaction amounts for a particular cell exceeds a threshold TH1 and the total number of datasets in the cell exceeds threshold TH2 (i.e., if inequality 1201 and inequality 1202 exist for that particular cell), then the economic nexus for the domain and year associated with that particular cell is met and a notification to the client entity is merited. For example, the recommendation engine 154 of the OSP 140 of FIG. 1B and/or the recommendation engine 554 the OSP 540 of FIG. 5 may determine that the notification to the client entity is merited based on the application of this digital rule.

Figure 13:
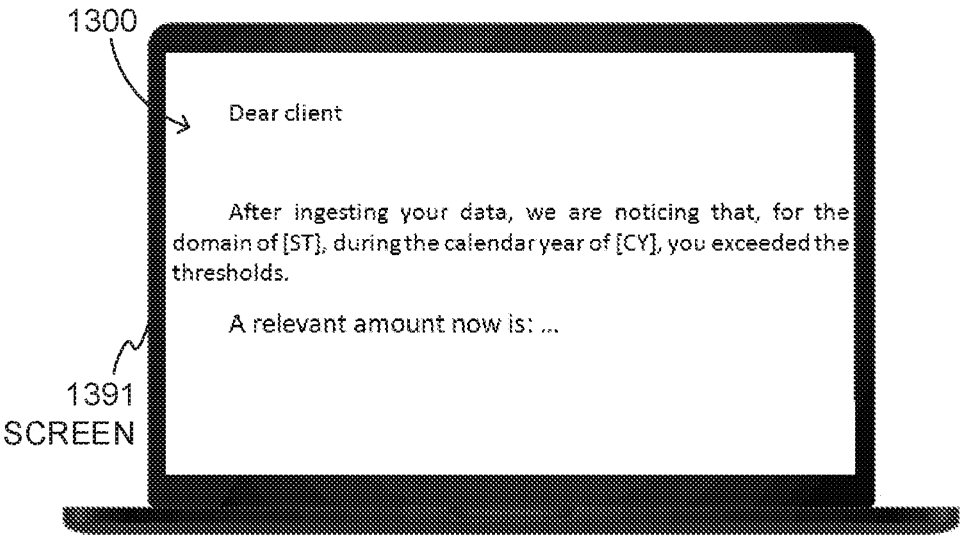
FIG. 13 illustrates a sample graphical user interface (GUI) that notifies about results of applying rules according to embodiments of the disclosure.

FIG. 13 illustrates a sample GUI 1300 that notifies about results of applying rules according to embodiments of the disclosure. The GUI 1300 may have been caused to be presented by OSP 140 of FIG. 1B within client account module 142 and within client UI portal 144 and/or by OSP 540 of FIG. 5, within client account module 542 and within client UI portal 544. For example, the recommendation/output API 156 of FIG. 1B may fetch and make available, to client account module 142 and to the client UI portal 144, the information presented in GUI 1300.

The GUI 1300 may appear on screen 1391 (e.g., screen 116 of FIG. 1B and/or screen 516 of FIG. 5) in response to the OSP computer system (e.g., the computer system of OSP 140 of FIG. 1B or OSP 540 of FIG. 5) determining that a nexus for a particular domain (represented by ST) and calendar year (represented by CY) is met based on application of the digital rule as described with respect to FIG. 12. For example, the GUI 1300 may include an alert or other notification that alerts the client entity 110 or client entity 510 of the potential lack of tax compliance in the tax jurisdiction ST for the calendar year CY, the reason for the potential lack of tax compliance (e.g., the client entity exceeded the economic nexus threshold for that jurisdiction ST for the calendar year CY) as well as a relevant resource amount (e.g., sum of transactions amounts, total number of transactions, an amount by which the threshold(s) were exceeded and/or amount of tax that may be due).

Such notifications about results of applying rules may be provided by the computer system of the OSP in various other manners in various different embodiments, such as including, but not limited to: email, updates to user accounts, text messages, automated phone calls, chat messages, web-based messages, desktop computer alerts, pop-up messages or alerts, mobile device messages, mobile device applications, etc. In some embodiments, a message may be electronically initiated by the computer system of the OSP to be sent by mail or courier to an address selected by the client entity. In some embodiments, the notifications do not indicate there is a potential lack of tax compliance, but just that there is a notification available for the client entity and may include instructions or a link for receiving or otherwise accessing further information, including information regarding potential lack of tax compliance. In some embodiments, the notification regarding potential lack of tax compliance may include or provide access to a notification regarding a potential lack of tax compliance regarding reporting, collecting, and/or remitting transaction taxes for individual jurisdictions based on the application of the digital rules.

Figure 14:
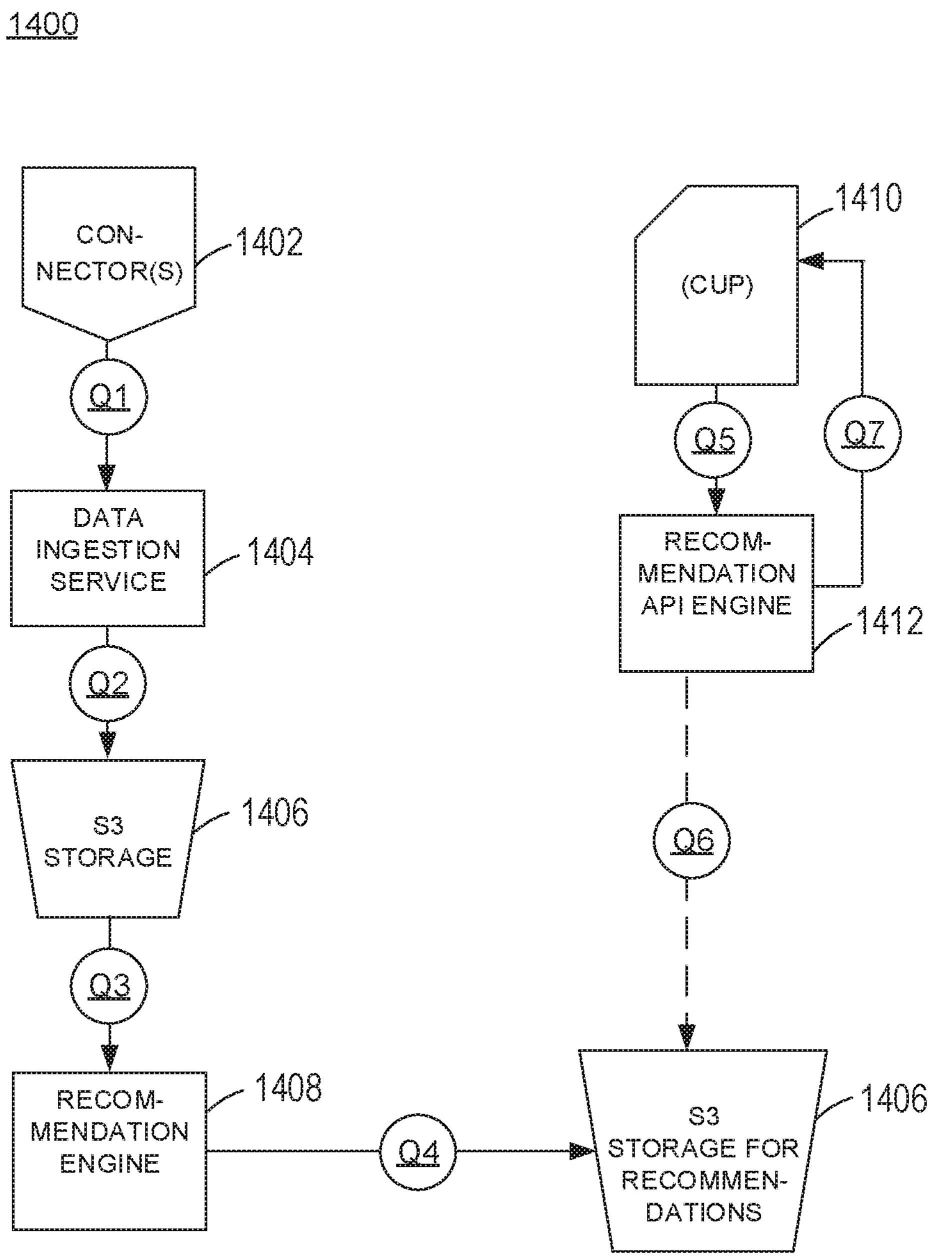
FIG. 14 illustrates an example of a high-level data flow diagram according to various embodiments of the disclosure.

FIG. 14 illustrates an example of a high-level data flow diagram 1400 according to various embodiments of the disclosure. In embodiments, the connector, such as connector 122 of FIG. 1B and/or connector 522 of FIG. 5 works and communicates with the OSP, such as the OSP 140 of FIG. 1B and/or the OSP 540 of FIG. 5 to collect various client entity and associated transaction information. The connector works and communicates with the OSP to collect various client entity and associated transaction information to the extent the information is available as stored in the ERP platform, such as ERP platform 120 of FIG. 1B or ERP platform 520 of FIG. 5, and/or in the client entity computer system, such as the computer system 114 of FIG. 1B or the computer system 514 of FIG. 5.

Such client entity information may include, but is not limited to: proof of consent and agreement of the client entity to terms of the OSP; tax identifiers or identifications numbers of the client entity, addresses of all companies and warehouses of the client entity, and system versions and capabilities of systems of the client entity and ERP platform. In an example use case, such client entity and associated transaction information may include, but is not limited to: transaction history including full copies of all accounts receivable (AR) and accounts payable (AP) invoices; item catalog(s) including all product descriptions for products of the client entity; tax authorities for various tax jurisdictions associated with the client entity and transactions; and store locations of the client entity.

The OSP may upload the data in a raw format, native to that connector of the ERP platform associated with the client entity and then implements a cloud process to normalize and convert the data, such as, for example, described with respect to FIG. 1B through FIG. 11. In some embodiments, the OSP may determine whether it is possible to upload all such client entity and transaction information in a normalized schema for each type of data, and if it is possible, will do so such that the OSP does not have to do the associated normalization and conversion. In an example use case, the OSP may derive one or more of the following from the uploaded information: company information of the client entity for onboarding onto and company setup within the OSP; annual document count of the client entity (for sales quoting of services of the OSP to the client entity); likely economic nexus locations (including local locations) for purposes of determining transaction tax liability; item taxability for items the client entity sells; locations for tax return filings; tax exemption information; and streamlined sales tax (SST) eligibility of the client entity based on regulations regarding Streamlined Sales and Use Tax Agreements with particular tax jurisdictions. Such derived information may be provided as, or as part of, recommendations to the client entity regarding economic nexus the client entity may have that may trigger transaction tax liability of the client entity.

The above operations may be implemented in an example embodiment illustrated with respect to FIG. 14. For example, at operation Q1, connector(s) 1402, such as connector 122 of FIG. 1B and/or connector 522 of FIG. 5, posts data to a data ingestion service 1404, such as that provided by the data ingestion engine 152 of FIG. 1B or data ingestion engine 552 of FIG. 5. At operation Q2, the data ingestion service 1404 saves the data to storage S3 1406. At operation Q3, the data being stored to storage S3 1406 triggers recommendation engine 1408 to provide recommendations based on the stored data. For example, the recommendation engine 1408 may be an example of the recommendation engine 154 of FIG. 1B or recommendation engine 554 of FIG. 5. In various embodiments, storage S3 1406 may be database(s) 107 if FIG. 1A, memory storage 1856 of FIG. 18 and/or storage unit 1916 of FIG. 19. At operation Q4, the recommendation engine 1408 stores the recommendations in a portion of storage S3 1406 that is for storage of recommendations.

At operation Q5, the client entity requests recommendations from the recommendation API engine 1412 via a client UI portal (CUP) 1410. For example, the CUP 1410 may be an example of the CUP 144 of FIG. 1B or the CUP 544 of FIG. 5 and the recommendation API engine 1412 may be an example of the recommendation/output API 156 of FIG. 1B or the recommendation/output API 556 of FIG. 5. At operation Q6, the recommendation API engine 1412 pulls data (e.g., stored recommendations) from the storage S3 1406 and at operation Q7 the recommendation API engine 1412 provides recommendations to the client entity via the CUP 1410.

Figure 15:
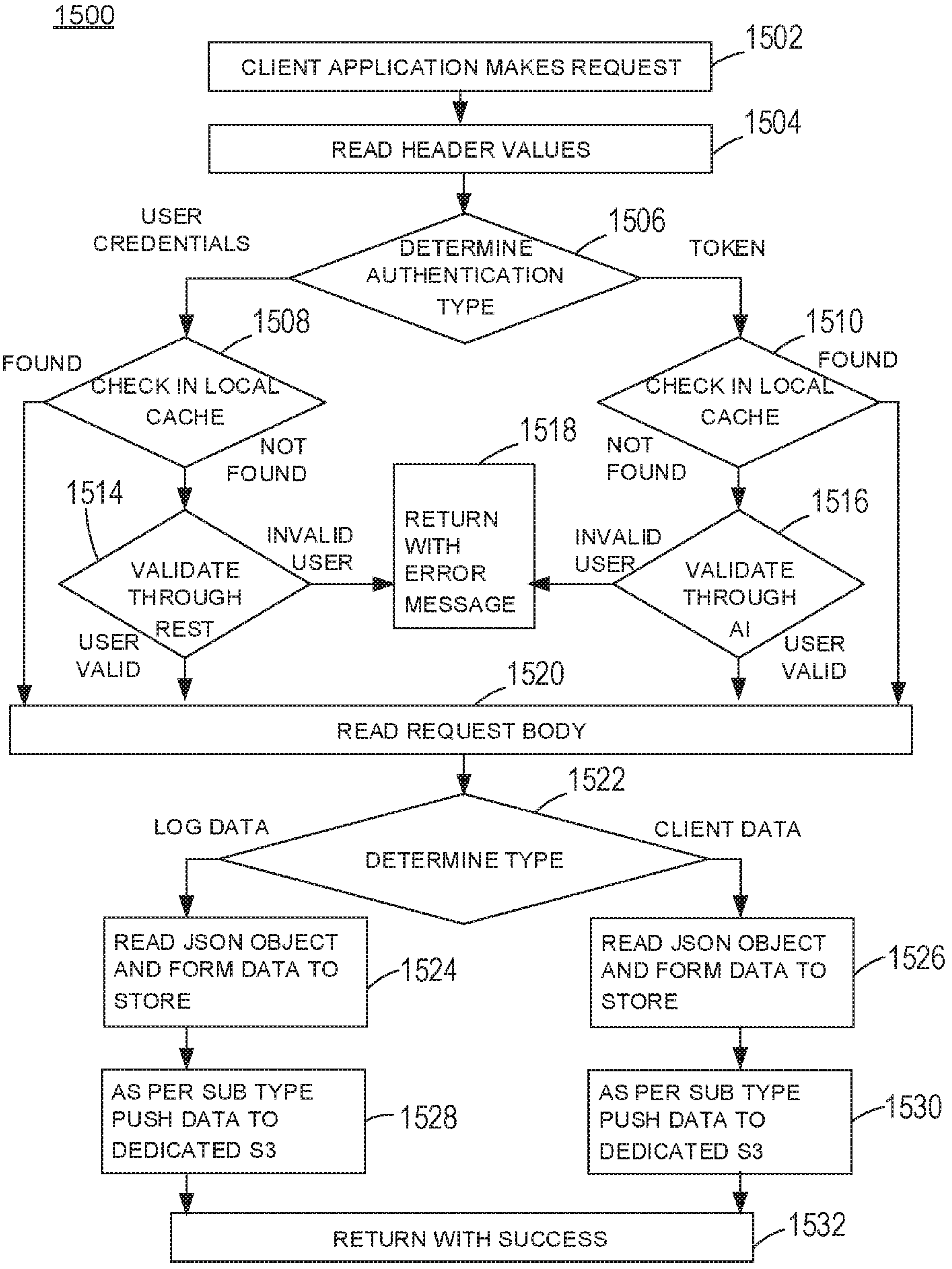
FIG. 15 is a flow diagram illustrating a sample operation of a data ingestion API service according to an embodiment of the disclosure.

FIG. 15 is a flow diagram 1500 illustrating a sample operation of a data ingestion API service according to an embodiment of the disclosure. For example, the data ingestion API service may be that provided by the data ingestion service 1404 of FIG. 14. The API of the data ingestion API service of FIG. 15 is responsible to store data fetched or received from different sources. Client applications can consume this API to send data like application logs, transactions, locations, products, etc. The data will be stored for further processing. The API of the data ingestion API service of FIG. 15 can accept user credentials and tokens for authentication. The user credentials and/or tokens provided may be validated through a Representational State Transfer (RESTful or REST) API and/or artificial intelligence (AI).

In the example shown in FIG. 15, at operation 1502 the client application, such as that of the ERP platform 120 and/or connector 122 of FIG. 1B or the ERP platform 520 and/or connector 522 of FIG. 5, makes a request, which is received by the data ingestion API service. At operation 1504, the data ingestion API service reads header values of the request. At operation 1506 the data ingestion API service determines (e.g., based on the header values) the type of authentication that will be used to validate the request.

If user credentials are to be used to validate the request, then at operation 1508 the data ingestion API service checks in local cache to see if the user credentials can be found there. If the user credentials cannot be found in local cache, then the data ingestion API service validates the request via REST API authentication. If the REST API authentication fails, then the data ingestion API service determines the user is invalid and an error message is returned at operation 1518. If the user credentials can be found in local cache or the REST API authentication succeeds, then the data ingestion API service reads the body of the request at operation 1520.

If a security token is to be used to validate the request, then at operation 1510 the data ingestion API service checks in local cache to see if the security token can be found there. If the security token cannot be found in local cache, then the data ingestion API service validates the request via authentication through an artificial intelligence (AI) engine (e.g., using an AI model based on user access patterns). If the validation through AI fails, then the data ingestion API service determines the user is invalid and an error message is returned at operation 1518. If the user credentials can be found in local cache or authentication through AI succeeds, then the data ingestion API service reads the body of the request at operation 1520. In various embodiments, the user credentials and/or token provided with the request may be authenticated through the REST API and/or AI methodologies.

At operation 1522 the data ingestion API service determines the type of request (e.g., based on the body of the request). If the type of request is determined to be that in which client data is to be ingested (e.g., datasets including data of transactions of the client entity), then at operation 1526 the data ingestion API service reads the JavaScript Object Notation (JSON) object and form data for the client data type and at operation 1530 pushes that data to the dedicated portion of storage S3 for that type of data. JSON is an open standard file format, and data interchange format, that uses human-readable text to store and transmit data objects consisting of attribute-value pairs and array data types. However, other file types and data formats may be used in various embodiments. At operation 1532, the data ingestion API service then returns value indicating the ingestion of the data was successful.

If the type of request is determined to be that in which log data is to be ingested (client entity application logs), then at operation 1524 the data ingestion API service reads the JSON object and form data for the log data type and at operation 1528 pushes that data to the dedicated portion of storage S3 for that type of data. In various other embodiments, file types and data formats other than JSON may be used. At operation 1532, the data ingestion API service then returns value indicating the ingestion of the data was successful.

Figure 16:
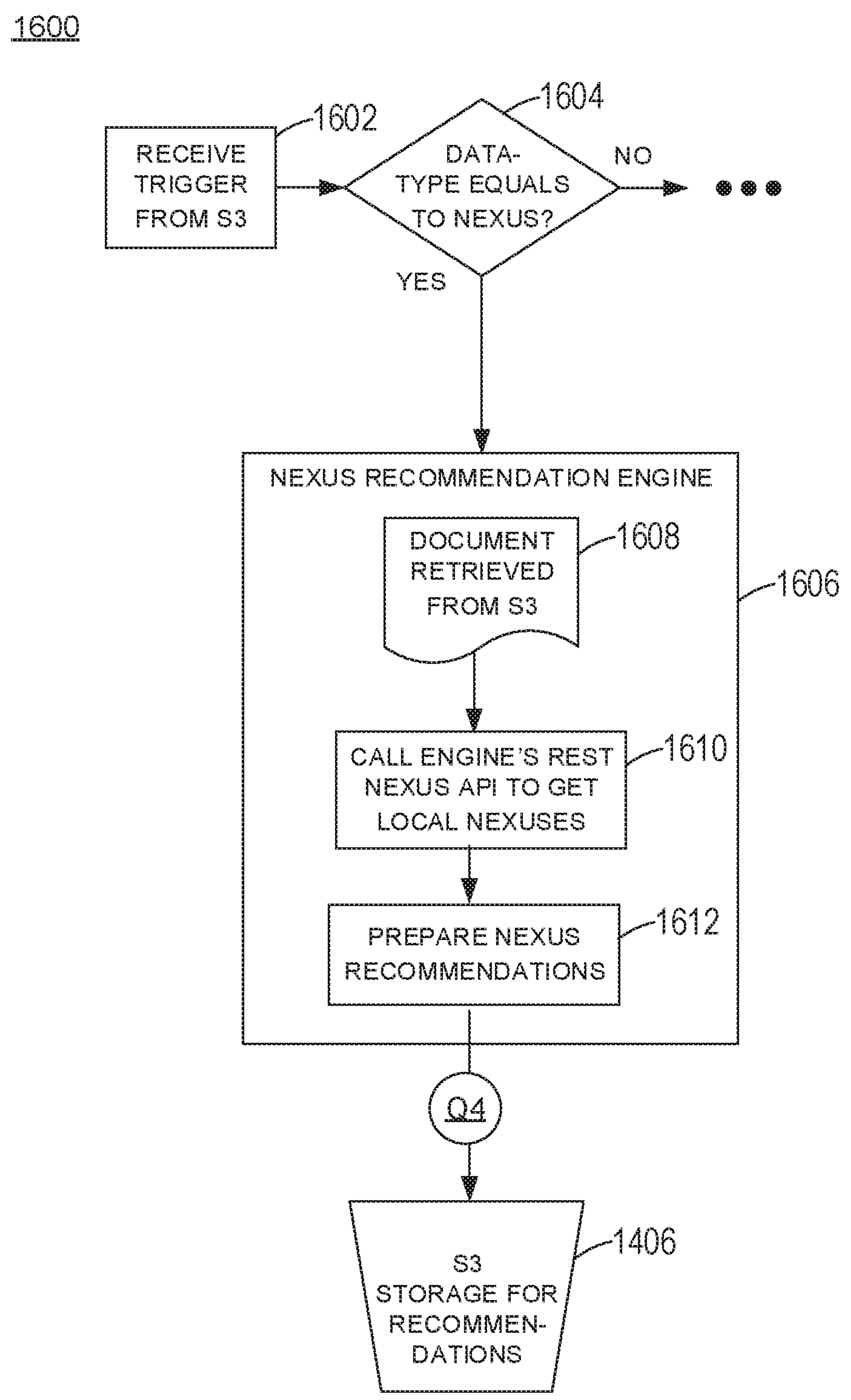
FIG. 16 is a flow diagram illustrating implementation of an engine by an offline processor according to an embodiment of the disclosure.

FIG. 16 is a flow diagram 1600 illustrating implementation of an engine by an offline processor according to an embodiment of the disclosure. In particular, the nexus recommendation engine 1606 is an example of the recommendation engine 1408 of FIG. 14. The recommendation engine 1606 may be implemented by an offline processor which will process received data, such as that ingested by the data ingestion API service of FIG. 15 provided by the data ingestion service 1404 of FIG. 14, and prepare recommendations based on triggers of the data being stored to storage S3 1406 of FIG. 14.

At operation 1602, data being stored to storage S3 1406 of FIG. 14 triggers making a determination at operation 1604 whether the type of data stored is equal that which a nexus determination may be based on. If the type of data stored is equal that which a nexus determination may be based on, then the process proceeds to 1608 in the nexus recommendation engine 1606 where the relevant document is retrieved from storage (e.g., S3 1406 of FIG. 14). Otherwise, the process does not call the nexus recommendation engine 1606.

At operation 1610, the REST nexus API of the nexus recommendation engine 1606 is called to get the digital rules pertaining to thresholds for establishment of local nexuses in various applicable domains that are associated with the document retrieved.

At operation 1612 nexus recommendations are prepared based on application of the digital rules to the data of the retrieved document to determine whether the applicable thresholds have been met to establish one or more nexuses in various applicable domains that are associated with the retrieved document. At operation Q4, the nexus recommendation engine 1606 stores the recommendations in a portion of storage S3 1406 that is for storage of recommendations.

Figure 17:
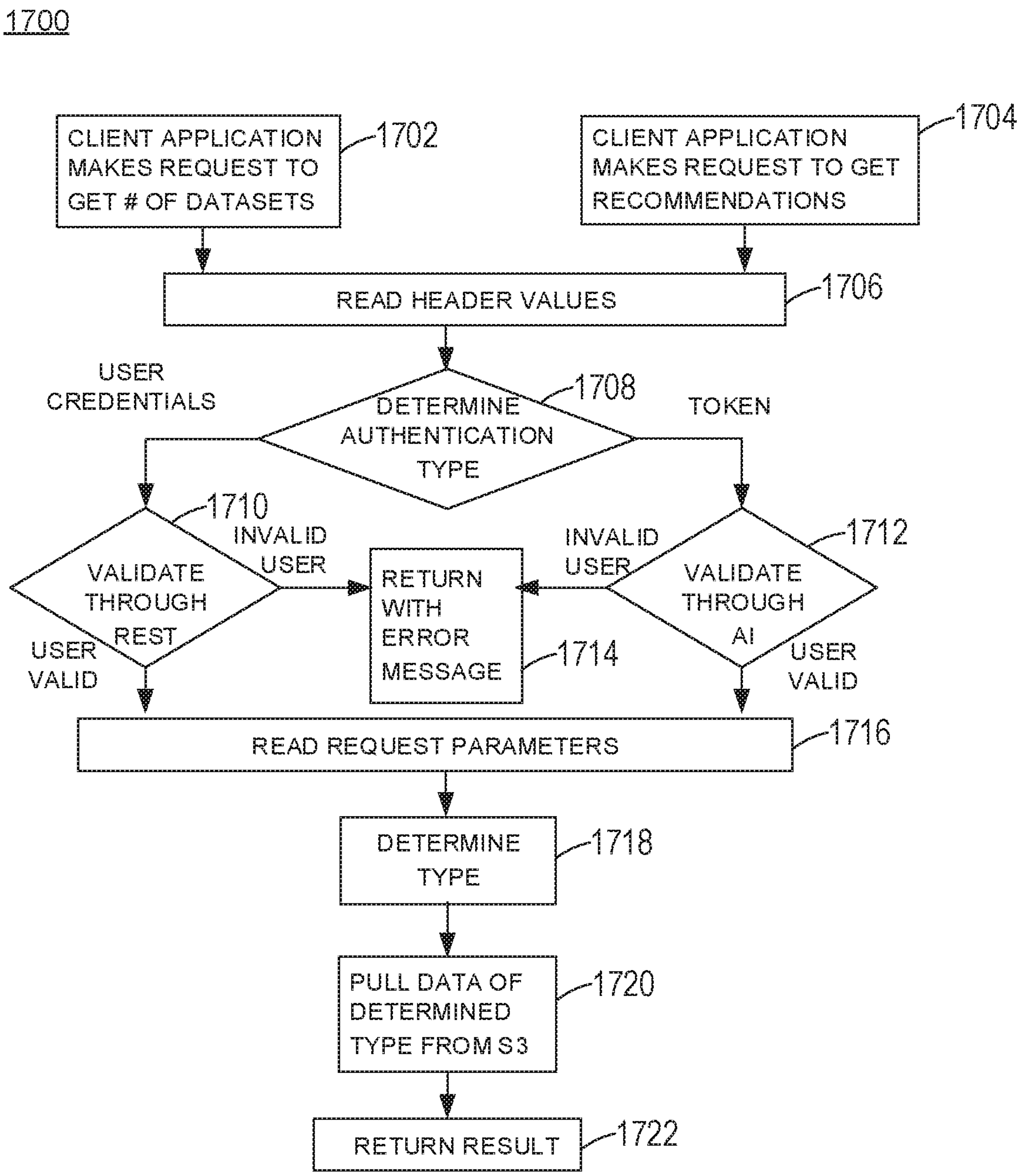
FIG. 17 is a flow diagram illustrating a sample operation of a recommendation API service according to an embodiment of the disclosure.

FIG. 17 is a flow diagram 1700 illustrating a sample operation of a recommendation API service according to an embodiment of the disclosure. In particular, the recommendation API service illustrated FIG. 17 may be implemented by the recommendation API engine 1412 of FIG. 14, which is an example of the recommendation/output API 156 of FIG. 1B or the recommendation/output API 556 of FIG. 5.

The client application, such as that of the ERP platform 120 and/or connector 122 of FIG. 1B or the ERP platform 520 and/or connector 522 of FIG. 5, may make requests, via the recommendation API service, to get various different types of data. For example, at operation 1702, the client application may request to get stored data, such as client application logs, transactions, locations, products, etc., that are available in a number of client datasets and, at operation 1702, the client application may request to get recommendations based on relationship instances (e.g., transactions)

represented by the datasets. At operation 1706 the recommendation API service then reads the header values of such requests and at operation 1708 determines (e.g., based on the header values) the type of authentication that will be used to validate the request.

If user credentials are to be used to validate the request, then at operation 1710 the recommendation API service validates the request via REST API authentication. If the REST API authentication fails, then the recommendation API service determines the user is invalid and an error message is returned at operation 1714. If the REST API authentication succeeds, then the recommendation API service reads the request parameters at operation 1716.

If a security token is to be used to validate the request, then at operation 1712 the recommendation API service validates the request via authentication through an artificial intelligence (AI) engine (e.g., using an AI model based on user access patterns). If the validation through AI fails, then the recommendation API service determines the user is invalid and an error message is returned at operation 1716. If the authentication through AI succeeds, then the recommendation API service reads the request parameters at operation 1716. In various embodiments, the user credentials and/or token provided with the request may be authenticated through the REST API and/or AI methodologies.

At operation 1522 the recommendation API service determines the type of request (e.g., based on the request parameters). At 1720, the recommendation API service pulls the data (e.g., from data to storage S3 1406 of FIG. 14) that is of the determined type. For example, if the request is to get the type of data such as client application logs, transactions, locations, products, etc., that are available in a number of client datasets then data of that type will be pulled. However, if the request to get recommendations based on relationship instances (e.g., transactions) represented by the datasets, then the applicable recommendations will be pulled. At 1722 the recommendation API service returns the result (e.g., the pulled data of the determined type) to the client application.

Software and System Architectures

FIG. 18 is a block diagram illustrating an exemplary software architecture 1806, which may be used in conjunction with various hardware architectures herein described. FIG. 18 is a non-limiting example of a software architecture and it will be appreciated that other architectures may be implemented to facilitate the functionality described herein.

The software architecture 1806 may execute on hardware such as machine 1900 of FIG. 19 that includes, among other things, processors 1904, memory 1914, and I/O components 1918. A representative hardware layer 1852 is illustrated and can represent, for example, the machine 1900 of FIG. 19.

The representative hardware layer 1852 includes a processing unit 1854 having associated executable instructions 1804. Executable instructions 1804 represent the executable instructions of the software architecture 1806, including implementation of the methods, components and so forth described herein. The hardware layer 1852 also includes memory and/or storage modules memory/storage 1856, which also have executable instructions 1804. The hardware layer 1852 may also comprise other hardware 1858.

As used herein, a "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled.

Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of exemplary methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 18, the software architecture 1806 may be conceptualized as a stack of layers where each layer provides particular functionality. For example, the software architecture 1806 may include layers such as an operating system 1802, libraries 1820, applications 1816 and a presentation layer 1814. Operationally, the applications 1816 and/or other components within the layers may invoke application programming interface (API) API calls 1808 through the software stack and receive responses to the API calls 1808. Various messages 1812 may be transmitted and received via the applications 1816 and/or other components within the layers. The layers illustrated are representative in nature and not all software architectures have all layers. For example, some mobile or special purpose operating systems may not provide a frameworks/middleware 1818, while others may provide such a layer. Other software architectures may include additional or different layers.

The operating system 1802 may manage hardware resources and provide common services. The operating system 1802 may include, for example, a kernel 1822, services 1824 and drivers 1826. The kernel 1822 may act as an abstraction layer between the hardware and the other software layers. For example, the kernel 1822 may be responsible for memory management, processor management (e.g., scheduling), component management, networking, security settings, and so on. The services 1824 may provide other common services for the other software layers. The drivers 1826 are responsible for controlling or interfacing with the underlying hardware. For instance, the drivers 1826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1820 provide a common infrastructure that is used by the applications 1816 and/or other components and/or layers. The libraries 1820 provide functionality that allows other software components to perform tasks in an easier fashion than to interface directly with the underlying operating system 1802 functionality (e.g., kernel 1822, services 1824 and/or drivers 1826). The libraries 1820 may include system libraries 1844 (e.g., C standard library) that may provide functions such as memory allocation functions, string manipulation functions, mathematical functions, and the like. In addition, the libraries 1820 may include API libraries 1846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1820 may also include a wide variety of other libraries 1848 to provide many other APIs to the applications 1816 and other software components/modules.

The frameworks/middleware 1818 (also sometimes referred to as middleware) provide a higher-level common infrastructure that may be used by the applications 1816 and/or other software components/modules. For example, the frameworks/middleware 1818 may provide various graphic user interface (GUI) functions, high-level resource management, high-level location services, and so forth. The frameworks/middleware 1818 may provide a broad spectrum of other APIs that may be utilized by the applications 1816 and/or other software components/modules, some of which may be specific to a particular operating system 1802 or platform.

The applications 1816 include built-in applications 1838 and/or third-party applications 1840. Examples of representative built-in applications 1838 may include, but are not limited to, a contacts application, a browser application, a book reader application, a location application, a media application, a messaging application, and/or a game application. Third-party applications 1840 may include an application developed using the ANDROID™ or (OS™ software development kit (SDK) by an entity other than the vendor of the particular platform, and may be mobile software running on a mobile operating system such as IOS™, ANDROID™, WINDOWS® Phone, or other mobile operating systems. The third-party applications 1840 may invoke the API calls 1808 provided by the mobile operating system (such as operating system 1802) to facilitate functionality described herein.

The applications 1816 may use built in operating system functions (e.g., kernel 1822, services 1824 and/or drivers 1826), libraries 1820, and frameworks/middleware 1818 to create user interfaces to interact with users of the system. Alternatively, or additionally, in some systems interactions with a user may occur through a presentation layer, such as presentation layer 1814. In these systems, the application/ component "logic" can be separated from the aspects of the application/component that interact with a user.

FIG. 19 is a block diagram illustrating components of a machine 1900, according to some exemplary embodiments, able to read instructions from a machine-readable medium (e.g., a computer-readable storage medium) and perform any of the processes, methods, and/or functionality discussed herein. Specifically, FIG. 19 shows a diagrammatic representation of the machine 1900 in the exemplary form of a computer system, within which instructions 1910 (e.g., software, a program, an application, an applet, an app, or other executable code) for causing the machine 1900 to perform any one or more of the methodologies discussed herein may be executed. As such, the instructions 1910 may be used to implement modules or components described herein. The instructions 1910 transform the general, non-programmed machine 1900 into a particular machine 1900 programmed to carry out the described and illustrated functions in the manner described.

In some embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may be or include, but is not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1910, sequentially or otherwise, that specify actions to be taken by machine 1900. Further, while only a single machine 1900 is illustrated, the term "machine" or "computer system" shall also be taken to include a collection of machines or computer systems that individually or jointly execute the instructions 1910 to perform any of the methodologies discussed herein.

The machine 1900 may include processors 1904 (e.g., processors 1908 and 1912), memory memory/storage 1906, and I/O components 1918, which may be configured to communicate with each other, such as via bus 1902. The memory/storage 1906 may include a memory 1914, such as a main memory, or other memory storage, and a storage unit 1916, both accessible to the processors 1904 such as via the bus 1902. In this context, a "processor" may refer to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

The storage unit 1916 and memory 1914 store the instructions 1910 embodying any one or more of the methodologies or functions described herein. The instructions 1910 may also reside, completely or partially, within the memory 1914, within the storage unit 1916, within at least one of the processors 1904 (e.g., within the processor's cache memory), or any suitable combination thereof, during execution thereof by the machine 1900. Accordingly, the memory 1914, the storage unit 1916, and the memory of processors 1904 are examples of machine-readable media.

In this context, "machine-readable medium" refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1918 may include a wide variety of components to receive input, provide output, produce output, transmit information, exchange information, capture measurements, and so on. The specific I/O components 1918 that are included in a particular machine 1900 will depend on the type of machine. For example, portable machines such as mobile phones will likely include a touch input device or other such input mechanisms, while a headless server machine will likely not include such a touch input device. It will be appreciated that the I/O components 1918 may include many other components that are not shown in FIG. 19. The I/O components 1918 are grouped according to functionality merely for simplifying the following discussion and the grouping is in no way limiting. In various exemplary embodiments, the I/O components 1918 may include output components 1926 and input components 1928. The output components 1926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. Collectively, one or more of the I/O components 1918 may be referred to as a "user interface" for receiving input, and displaying output, to a user. Additionally, the term "user interface" may be used in other contexts such as, for example, to describe a graphical user interface (e.g., a window displayed on a display screen to receive input from, and display output to, a user).

In further exemplary embodiments, the I/O components 1918 may include biometric components 1930, motion components 1934, environmental environment components 1936, or position components 1938 among a wide array of other components. For example, the biometric components 1930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1934 may include acceleration sensor components (e.g., accelerometer), gravitation sensor components, rotation sensor components (e.g., gyroscope), and so forth. The environment components 1936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1918 may include communication components 1940 operable to couple the machine 1900 to a network 1932 or devices 1920 via coupling 1922 and coupling 1924 respectively. For example, the communication components 1940 may include a network interface component or other suitable device to interface with the network 1932. In further examples, communication components 1940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1920 may be another machine or any of a wide variety of peripheral devices (e.g., a peripheral device coupled via a Universal Serial Bus (USB)).

Moreover, the communication components 1940 may detect identifiers or include components operable to detect identifiers. For example, the communication components 1940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1940, such as, location via Internet Protocol (IP) geolocation, location via Wi-Fi® signal triangulation, location via detecting a NFC beacon signal that may indicate a particular location, and so forth.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

A number of embodiments are possible, each including various combinations of elements. When one or more of the appended drawings—which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases “constructed to”, “adapted to” and/or “configured to” denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc. patent applications, whether mentioned in this document or in an Application Data Sheet (“ADS”) of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as “open” terms. For example, the term “including” should be interpreted as “including but not limited to,” the term “having” should be interpreted as “having at least,” etc. If a specific number is ascribed to a claim recitation, this number is a minimum but not a maximum unless stated otherwise. For example, where a claim recites “a” component or “an” item, it means that the claim can have one or more of this component or this item.

In construing the claims of this document, 35 U.S.C. § 112(f) is invoked by the inventor(s) only when the words “means for” or “steps for” are expressly used in the claims. Accordingly, if these words are not used in a claim, then that claim is not intended to be construed by the inventor(s) in accordance with 35 U.S.C. § 112(f).

What is claimed is:

1. An online software platform (OSP) computer system including at least:

one or more processors; and one or more non-transitory computer-readable storage media having stored thereon instructions which, when executed by the one or more processors, result in operations including at least:

receiving via a network, from a client computer system of a client entity, one or more electronic communications that include an onboarding request for data of the client entity that is stored by an enterprise resource planning (ERP) computer system distinct from the OSP computer system, the onboarding request including ERP identification information about the ERP computer system and authentication information to access the data;

contacting, using the ERP identification information, the ERP computer system;

accessing, using the authentication information, the data of the client entity;

copying the accessed data onto the one or more non-transitory computer-readable storage media;

applying one or more digital rules to the copied data to generate a determination; and transmitting one or more electronic communications to the client computer system that make available an indication of the determination.

2. The OSP computer system of claim 1, in which the operations further include:

causing to be presented, on a screen of the client computer system, a graphical user interface (GUI) that includes a field to receive the ERP identification information.

3. The OSP computer system of claim 1, in which the operations further include:

causing to be presented, on a screen of the client computer system, a graphical user interface (GUI) that includes a field to receive the authentication information.

4. The OSP computer system of claim 1, in which:

the onboarding request further includes a permission indication, and the operations further include: causing to be presented, on a screen of the client computer system, a graphical user interface (GUI) that includes a field to receive the permission indication.

5. The OSP computer system of claim 1, in which:

the copied data is in a first format, the operations further include: converting the copied data from the first format to a second format different from the first format, and the one or more digital rules are applied to the data in the second format.

6. The OSP computer system of claim 5, in which:

the copied data includes a dataset, the dataset in the first format includes a first dataset identifier and data in a first order, and the dataset in the second format includes a second dataset identifier and data in a second order different from the first order.

7. The OSP computer system of claim 1, in which:

the copied data include datasets that include respective attributes, the operations further include: filtering the datasets according to at least one of the attributes, and the one or more digital rules are applied to the filtered datasets.

8. The OSP computer system of claim 7, in which:
the attributes are time stamps.

9. The OSP computer system of claim 7, in which:
the attributes are location codes indicating locations.

10. The OSP computer system of claim 7, in which:
the datasets are filtered according to two of the attributes.

11. The OSP computer system of claim 1, in which:
the copied data include datasets,
the datasets include respective numerical resource values,
applying the one or more digital rules includes adding at least two of the numerical resource values to generate a sum, and comparing the sum to a sum threshold, and
the indication indicates a result of the comparison to the sum threshold.

12. The OSP computer system of claim 1, in which:
the copied data include datasets that include respective attributes,
the operations further include: filtering the datasets according to at least one of the attributes,
applying the one or more digital rules includes counting the filtered datasets to generate a count, and comparing the count to a count threshold, and
the indication indicates a result of the comparison to the count threshold.

13. The OSP computer system of claim 12, in which:
the attributes include respective numerical resource values, and
applying the one or more digital rules further includes adding the numerical resource values of the filtered datasets to generate a sum, and comparing the sum to a sum threshold, and
the indication further indicates a result of the comparison to the sum threshold.

14. The OSP computer system of claim 1, in which the operations further include:
causing to be presented, on a screen of the client computer system, a graphical user interface (GUI) that includes the indication of the determination.

* * * * *